United States Patent [19]
Yamato

[11] Patent Number: 6,134,585
[45] Date of Patent: Oct. 17, 2000

[54] STREAM TRANSFER CONTROL SYSTEM FOR DISTRIBUTING STREAMS OF MOVING IMAGES AND VOICE TO CLIENTS AND REPRODUCING THE SAME AND DATA READING METHOD THEREOF

[75] Inventor: Jun-ichi Yamato, Toyko, Japan

[73] Assignee: NEC Corporation, Tokyo, Japan

[21] Appl. No.: 09/061,860

[22] Filed: Apr. 17, 1998

[30] Foreign Application Priority Data

Apr. 18, 1997 [JP] Japan ..................................... 9-116134

[51] Int. Cl.[7] ...................................................... G06F 15/16
[52] U.S. Cl. .............................. 709/219; 348/7; 455/4.2
[58] Field of Search .................................. 709/217–219, 709/203, 206, 225, 233, 334; 348/7; 455/4.2; 707/10

[56] References Cited

U.S. PATENT DOCUMENTS

| | | | |
|---|---|---|---|
| 5,913,039 | 5/1999 | Nakamura et al. | 395/200.61 |
| 5,956,488 | 9/1999 | Suzuki | 395/200.49 |
| 6,014,695 | 1/2000 | Yamashita et al. | 709/219 |
| 6,026,431 | 2/2000 | Hintichs et al. | 709/203 |
| 6,041,351 | 3/2000 | Kho | 709/224 |
| 6,052,797 | 4/2000 | Ofek et al. | 714/6 |
| 6,055,547 | 4/2000 | Cooper et al. | 707/2.4 |

FOREIGN PATENT DOCUMENTS

| | | |
|---|---|---|
| 7-93237 | 4/1995 | Japan . |
| 8-111689 | 4/1996 | Japan . |
| 8-204741 | 8/1996 | Japan . |
| 8-255119 | 10/1996 | Japan . |
| 9-70028 | 3/1997 | Japan . |
| 9-149377 | 6/1997 | Japan . |
| 9-181765 | 7/1997 | Japan . |
| 9-261617 | 10/1997 | Japan . |

OTHER PUBLICATIONS

H. Sakamoto et al., "A Large Scale Mutliple–Access Method for Video Streams", Transactions of Institute of Electronics, Information and Communication of Japan, vol. J78–D–II, No. 1 (1995), pp. 76–85.

E. T. Kalns et el., "Video on Demand Using the Vesta Parallel File System", Dept. of Computer Science–Michigan State Univ. and IBM T.J. Watson Research Center, pp. 1–16.

K. Nishimura et al., "Highspeed and High–Multiple Processing Techiques for Video Servers", NTT Human Interface Laboratories, (1994), pp. 17–24.

*Primary Examiner*—Victor R. Kostak
*Attorney, Agent, or Firm*—Foley & Lardner

[57] ABSTRACT

A stream transfer control system including a server unit and a plurality of clients connected to each other through a network, the server unit including a plurality of transmission buffers provided corresponding to the respective clients, a read management unit for issuing a data reading request upon receiving a transfer request from a client, as well as issuing a data reading request every time a data block stored in the transmission buffer is read to empty the buffer, and a data transfer unit for reading a data block in the transmission buffer after a lapse of a fixed time since when a transfer request arrives at the read management unit and at every lapse of the fixed time from then on, thereby transferring streams to the plurality of clients over the network.

20 Claims, 24 Drawing Sheets

STREAM TRANSFER CONTROL SYSTEM FOR DISTRIBUTING STREAMS OF MOVING IMAGES AND VOICE TO CLIENTS AND REPRODUCING THE SAME AND DATA READING METHOD THEREOF

BACKGROUND OF THE INVENTION

1. Field of the Invention

The present invention relates to a stream transfer control system having a server unit which distributes streams of moving images and voice to a plurality of clients over a network at the request for transfer from a client and a data reading method thereof.

2. Description of the Related Art

Information continues in terms of time such as moving images and voice is referred to as a stream. Multimedia system has been developed which is composed of a server unit for coding and accumulating such streams and a terminal unit for decoding streams received from the server unit over a network to reproduce moving images and voice.

One of such systems is a VoD (Video on Demand) system. In the VoD system, where an STU (Set Top Unit) as a terminal unit and a video server as a server unit are connected through a network, a user who wants to view picture designates a reproduction position of a video title which he wants to reproduce by means of the STU following the same procedure as that for operating a video cassette recorder. Video server which has numerous coded video titles accumulated at a secondary storage unit, reads, according to a command sent from a STU, picture information of a designated video title from the designated position on among the accumulated video titles and transmits the same to the STU which has issued the command. The STU decodes the picture information sent over the network to reproduce the picture. The STU is also allowed during the reproduction of predetermined picture to conduct such operation as change of a video title to be reproduced and jump from one scene to another to reproduce the same title starting at another position.

Video server, as mentioned above, reads desired data from a secondary storage unit in accordance with a user's instruction and distributes the same to an STU. Control at the video server conducted at this time is referred to as transfer control. In a VoD system, one video server distributes streams to a plurality of STUs. Having a plurality of secondary storage units, a video server ensures a throughput (the amount of data readable per unit time) necessary for distributing a plurality of streams at a time. In this case, data of each video title is dispersedly stored in secondary storage units.

Since in a VoD system, data of video titles are thus dispersedly stored in a plurality of secondary storage units and a plurality of streams are serviced by one video server, inappropriate control from which secondary storage unit data of each stream is to be read might result in data reading concentrating on a particular secondary storage unit. In this case, since a processing capacity of the secondary storage unit will not be changed even when data reading concentrates thereon, a time required for the secondary storage unit from the arrival of a reading request to the actual start of reading processing will be increased. As a result, at a secondary storage unit on which data reading concentrates, response from when a request for data access is issued to the secondary storage unit until when a response returns will be degraded. A response time of data reading from the secondary storage unit is also affected by the amount of shifting of a magnetic head of the secondary storage unit.

As described in the foregoing, while a response time of a secondary storage unit is difficult to predict, a VoD system is designed to conceal variation in response time of secondary storage units in order not to affect reproduction at an STU by the transfer control at a video server because normal reproduction of picture also in terms of time at an STU is necessary.

One of conventional stream transfer control systems is, for example, a system disclosed in "System for Large-Scale Multiplex Access of Video Information" (Sakamonto, Nishimura and Nakano, Transactions of Institute of Electronics, Information and Communication Engineers of Japan Vol. J78-D-II, No. 1, pp76–85). The stream transfer control system recited in this literate, with individual switching means provided at each secondary storage unit to control each secondary storage unit at different timing, conducts control to prevent concentration of reading on a particular secondary storage unit so that the number of data reading from each secondary storage unit will not exceed a fixed value in a unit time.

In conventional stream transfer control systems of this kind, however, since a throughput of a secondary storage unit varies affected by the amount of shifting of a magnetic head as well as by the concentration of data reading on a particular secondary storage unit as described above, it is necessary to set an upper bound on the number of data read per unit time at a server unit so as not to affect reproduction at an STU even when a throughput varies. In other words, satisfactory improvement in performance can not be attained because assuming that a secondary storage unit has a worst throughput, the amount of throughput to be supplied by the server unit to a client should be determined.

Moreover, when a client once makes a request for data reading, conventional secondary storage units conduct reading unless the client cancels the request. When a client reads data from a secondary storage unit, however, not all the read data is always used effectively by the client. In an environment in which an application program is to be run with constraints imposed on time, when data in a secondary storage unit is required during the execution of the application program and if data reading is not completed within a time limit of the application program, the application program will be finished without completion of the processing using the data. In such a case, even when reading of the data is completed at the secondary storage unit, the application program to use the data will have been already finished. In other words, reading processing will be in vain.

Conventional secondary storage unit such as a terminate I/O Process Message of SCSI-2 allows a client to cancel a request which has been already issued to a secondary storage unit. For canceling the request, however, even if a time when the access will be invalid is known at the stage of the issuance of a request as mentioned in the above example, the client is required to execute processing for actively canceling the request, which is a laborious procedure.

SUMMARY OF THE INVENTION

An object of the present invention is to provide a stream transfer control system enabling a server unit which distributes streams to make the most of a throughput of a secondary storage unit to increase the number of streams supplied to clients and a data reading method thereof.

Another object of the present invention is to provide a stream transfer control system enabling a server unit which distributes streams to have improved distribution stability of the whole unit and preventing increase in a waiting time at the start of transfer and a data reading method thereof.

Further object of the present invention is to provide a stream transfer control system enabling a server unit which distributes streams to autonomously reduce processing of reading useless data from secondary storage units and a data reading method thereof.

According to the first aspect of the invention, a stream transfer control system comprising a server unit and a plurality of clients connected through a network, the server unit including secondary storage units for storing files which store streams and is divided into a plurality of data blocks and transferring streams to the plurality of the clients over the network at a request for transfer from the client, wherein the server unit comprises transmission buffer means provided in the plural corresponding to the respective clients for temporarily holding data blocks of a file read from the secondary storage units, read management means for issuing, upon reception of a transfer request from the client, as many data reading requests as the transmission buffer means corresponding to the client which has transmitted the transfer request, as well as every time the data blocks stored in the transmission buffer means are read to empty the transmission buffer means, issuing as many data reading requests as the transmission buffer means emptied, and data transfer means for, after a lapse of a fixed time from the arrival of the transfer request at the read management unit and at every lapse of the fixed time from then on, reading a data block in the transmission buffer means and continuously transmitting the same to the client which has transmitted the transfer request.

In the preferred construction, the read management means as an issuing source of the data reading request applies, to the data reading request, cancellation time as a time of canceling the data reading request and issues the request, and the secondary storage unit comprises a storage medium storing the file, a timer, request cancellation determining means for comparing the request cancellation time and the current time counted by the timer to determine to cancel the data reading request with the request cancellation time applied thereto when the current time is past the request cancellation time, and reading processing means for sending, at the time of start of data reading processing based on the data reading request, the request cancellation time applied to the data reading request to the request cancellation determining means to conduct data reading processing based on the data reading request when determination to cancel is not made by the request cancellation determining means.

In the preferred construction, the read management means as an issuing source of the data reading request applies, to the data reading request, a request cancellation time period as a time period before the data reading request is canceled and issues the request, and the secondary storage unit comprises a storage medium storing the file, a timer, request cancellation time calculating means, based on a request cancellation time period applied to the data reading request and the current time counted by the timer, for calculating a request cancellation time of canceling the data reading request, request cancellation determining means for comparing the request cancellation time calculated by the request cancellation time calculating means and the current time counted by the timer to determine to cancel the data reading request with the request cancellation time applied thereto when the current time is past the request cancellation time, and reading processing means for sending, at the time of start of data reading processing based on the data reading request, the request cancellation time applied to the data reading request to the request cancellation determining means to conduct data reading processing based on the data reading request when determination to cancel is not made by the request cancellation determining means.

In the preferred construction, the stream transfer control system further comprises transmission time calculating means for determining a data block transmission time, wherein the read management means applies, to the data reading request to be issued based on a transfer request received from the client, a transmission time determined by the transmission time calculating means as a request cancellation time which is a time of canceling the data reading request, wherein the secondary storage unit comprises request cancellation determining means for comparing the request cancellation time and the current time to determine to cancel the data reading request with the request cancellation time applied thereto when the current time is past the request cancellation time, and reading processing means for sending, at the time of start of data reading processing based on the data reading request, the request cancellation time applied to the data reading request to the request cancellation determining means to conduct data reading processing based on the data reading request when determination to cancel is not made by the request cancellation determining means.

In another preferred construction, the stream transfer control system further comprises transmission time period calculating means for determining a time period for conducting data block transmission processing, wherein the read management means applies, to the data reading request to be issued based on a transfer request received from the client, a transmission time period determined by the transmission time period calculating means as a request cancellation time period which is a time period before the data reading request is canceled, and the secondary storage unit comprises request cancellation time calculating means, based on a request cancellation time period applied to the data reading request and the current time, for calculating a request cancellation time of canceling the data reading request, request cancellation determining means for comparing the request cancellation time calculated by the request cancellation time calculating means and the current time to determine to cancel the data reading request with the request cancellation time applied thereto when the current time is past the request cancellation time, and reading processing means for sending, at the time of start of data reading processing based on the data reading request, the request cancellation time applied to the data reading request to the request cancellation determining means to conduct data reading processing based on the data reading request when determination to cancel is not made by the request cancellation determining means.

In another preferred construction, the stream transfer control system further comprises an I/O management data base for recording a data reading request issued by the read management unit, and cancellation requesting means, when at the time of transmission of data by the data transfer means, data reading of the data block is not completed, for searching the I/O management data base for the data reading request corresponding to the reading processing of the data to issue a cancellation request for canceling the data reading request detected to the secondary storage unit.

In another preferred construction, the stream transfer control system further comprises transmission start determining means for monitoring a state of the transmission buffer means after a lapse of a fixed time since when the transfer request arrives at the read management unit, and when more than a prescribed number of data is stored in the transmission buffer means, outputting a notification instructing on the start of transmission of the data, wherein the data transfer means, upon reception of a notification of transmission start from the transmission start determining means and at every lapse of the fixed time from then on, reads a data block in the transmission buffer means and continuously transmits the same to the client which has transmitted the transfer request.

In another preferred construction, the stream transfer control system further comprises an I/O management data base for recording a data reading request issued by the read management unit, and cancellation at jump requesting means, upon reception of a jump request from the client, for searching the I/O management data base for a data reading request already issued to issue a cancellation request for canceling the data reading request detected to the secondary storage unit, wherein the read management unit, on receiving the jump request, issues the data reading request based on the jump request, as well as every time the data blocks stored in the transmission buffer means are read to empty the transmission buffer means, issuing as many data reading requests as the transmission buffer means emptied, and the data transfer means, upon reception of a jump request by the read management means, cancels data transmission being executed to the client which has transmitted the jump request, and after a lapse of a fixed time since when the read management unit receives the jump request and at every lapse of the fixed time from then on, reads a data block in the transmission buffer means and continuously transmits the same to the client which has transmitted the transfer request.

According to the second aspect of the invention, a data reading method in a stream transfer control system comprising a server unit and a plurality of clients connected through a network, the server unit including secondary storage units for storing files which store streams and is divided into a plurality of data blocks and transferring streams to the plurality of the clients over the network at a request for transfer from the client, the data reading method comprising the steps of:

upon reception of a transfer request from the client, issuing as many data reading requests as the clients which have transmitted the transfer requests, as well as every time the data blocks stored in the transmission buffer means are read to empty the transmission buffer means, issuing as many data reading requests as the transmission buffer means emptied, temporarily holding data blocks of a file read from the secondary storage units at transmission buffer means provided in the plural corresponding to the respective clients, and after a lapse of a fixed time from the arrival of the transfer request at the read management means and at every lapse of the fixed time from then on, reading a data block in the transmission buffer means and continuously transmits the data block to the client which has transmitted the transfer request.

In the preferred construction, at the issuance of the data reading request based on a transfer request received from the client, applying a request cancellation time as a time of canceling the data reading request to the data reading request, at the start of data reading processing based on the data reading request, comparing the request cancellation time applied to the data reading request and the current time and when the current time is past the request cancellation time, determining to cancel the data reading request with the request cancellation time applied thereto, and when the determination is not made to cancel the reading request, conducting data reading processing based on the data reading request.

In the preferred construction, at the issuance of the data reading request based on a transfer request received from the client, applying a request cancellation time period as a time before the data reading request is canceled to the data reading request, at the start of data reading processing based on the data reading request, calculating a request cancellation time as a time of canceling the data reading request based on the request cancellation time period applied to the data reading request and the current time, comparing the request cancellation time and the current time and when the current time is past the request cancellation time, determining to cancel the data reading request with the request cancellation time applied thereto, and when the determination is not made to cancel the data reading request, conducting data reading processing based on the data reading request.

In the preferred construction, recording the data reading request at a data base, when data reading of the data block is not completed at a time point when the data transfer means transmits data, searching the I/O management data base for the data reading request corresponding to the reading processing of the data, and issuing a cancellation request for canceling the data reading request detected to the secondary storage unit.

In another preferred construction, monitoring a state of the transmission buffer means after a lapse of a fixed time since the arrival of the transfer request at the read management means, when more than a prescribed number of data is stored in the transmission buffer means, outputting a notification instructing on transmission start of the data, and at the time of output of the notification of transmission start and at every lapse of the fixed time from then on, reading a data block in the transmission buffer means and continuously transmitting the same to the client which has transmitted the transfer request.

In another preferred construction, recording the data reading request at a data base, at the reception of a jump request from the client, searching the data base for a data reading request already issued, issuing a cancellation request for canceling the data reading request detected to the secondary storage unit, issuing the data reading request based on the jump request, as well as every time the data blocks stored in the transmission buffer means are read to empty the transmission buffer means, issuing as many data reading requests as the transmission buffer means emptied, canceling data transmission being executed to the client which has transmitted the jump request, and after a lapse of a fixed time since the reception of the jump request by the read management means and at every lapse of the fixed time from then on, reading a data block in the transmission buffer means and continuously transmitting the same to the client which has transmitted the transfer request.

According to the third aspect of the invention, a computer readable memory storing a control program for controlling a data processing unit connected to clients through a network for reading streams from secondary storage units which store files storing streams and divided into a plurality of data blocks in response to a transfer request from the client and transferring the streams to the plurality of the clients over the network, the control program comprising the steps of:

upon reception of a transfer request from the client, issuing as many data reading requests as the clients which have transmitted the transfer request, as well as every time the data blocks stored in the transmission buffer means are read to empty the transmission buffer means, issuing as many data reading requests as the transmission buffer means emptied;

temporarily holding data blocks of a file read from the secondary storage units at the plurality of transmission buffer means provided corresponding to the respective clients; and after a lapse of a fixed time since the arrival of the transfer request at the read management means and every lapse of the fixed time from then on, reading a data block in the transmission buffer means and continuously transmitting the same to the client which has transmitted the transfer request.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
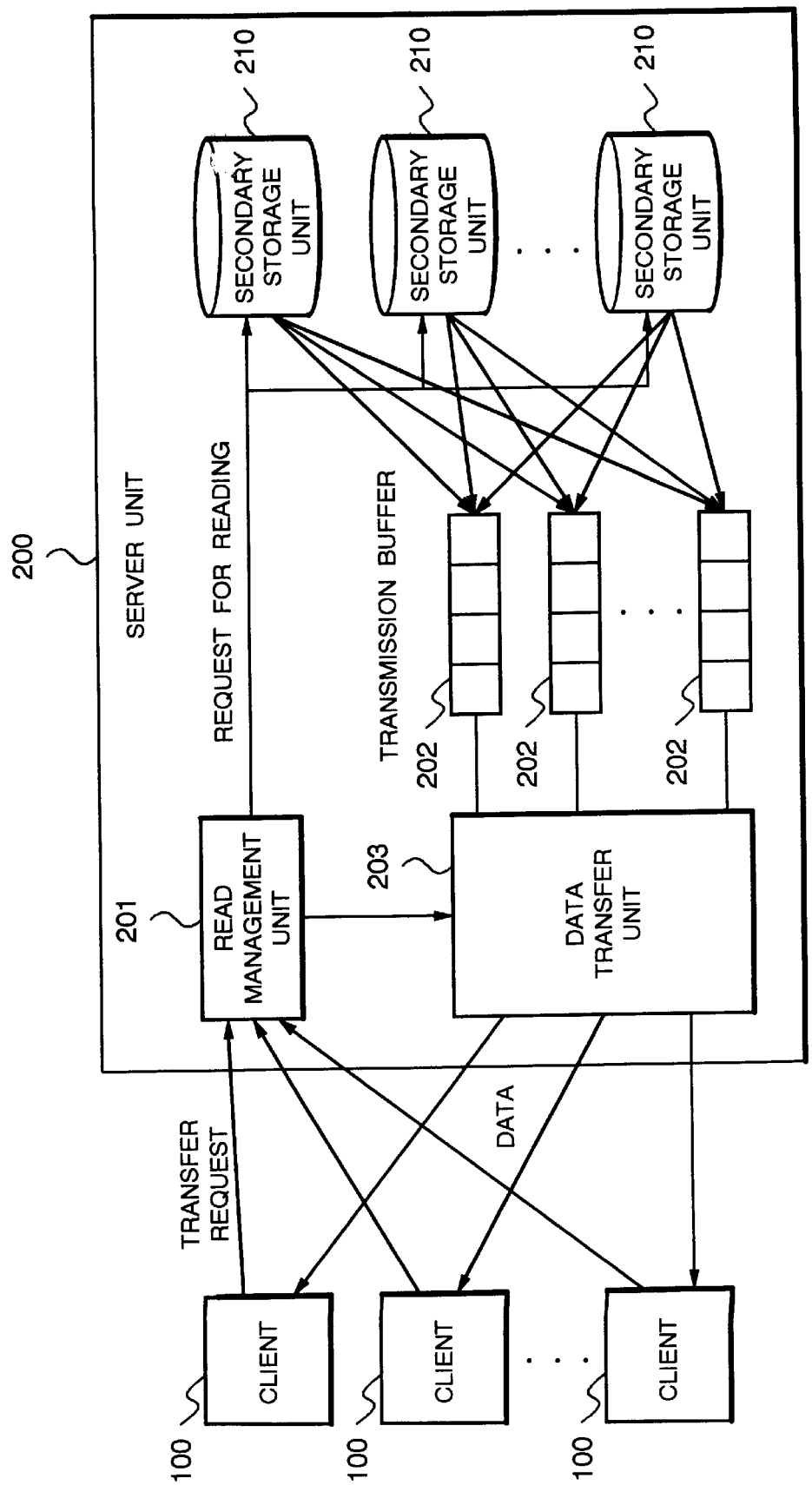
FIG. 1 is a block diagram showing structure of a stream transfer control system according to a first embodiment of the present invention.

FIG. 1 is a block diagram showing structure of a stream transfer control system according to a first embodiment of the present invention. With reference to FIG. 1, the stream transfer control system of the present embodiment includes a server unit 200 and a plurality of clients 100 connected to the server unit 200 through a network. The server unit 200 includes a read management unit 201, a transmission buffer 202, at least one secondary storage unit 210 and a data transfer unit 203. Stored in the secondary storage unit 210 are files in which streams (e.g. video data and voice data) are recorded. The file is divided, for example, into data blocks of fixed length. In FIG. 1, the client 100 issues a transfer request to the server unit 200 for the reproduction of streams. In response to transfer requests from a plurality of the clients 100, the server unit 200 transfers streams.

In the server unit 200, the read management unit 201 receives a transfer request from the client 100, as well as managing, for each client 100, information regarding the secondary storage unit 210 from which data is to be read, information for issuing block offset for read data and information regarding a data reading request yet to be issued. The transmission buffer 202 is composed of a plurality of buffers and assigns a number n (>2) of them to each client 100 to which streams are to be transferred. Processing at the read management unit 201 on a client 100 basis is shown in FIG. 2.

Figure 2:
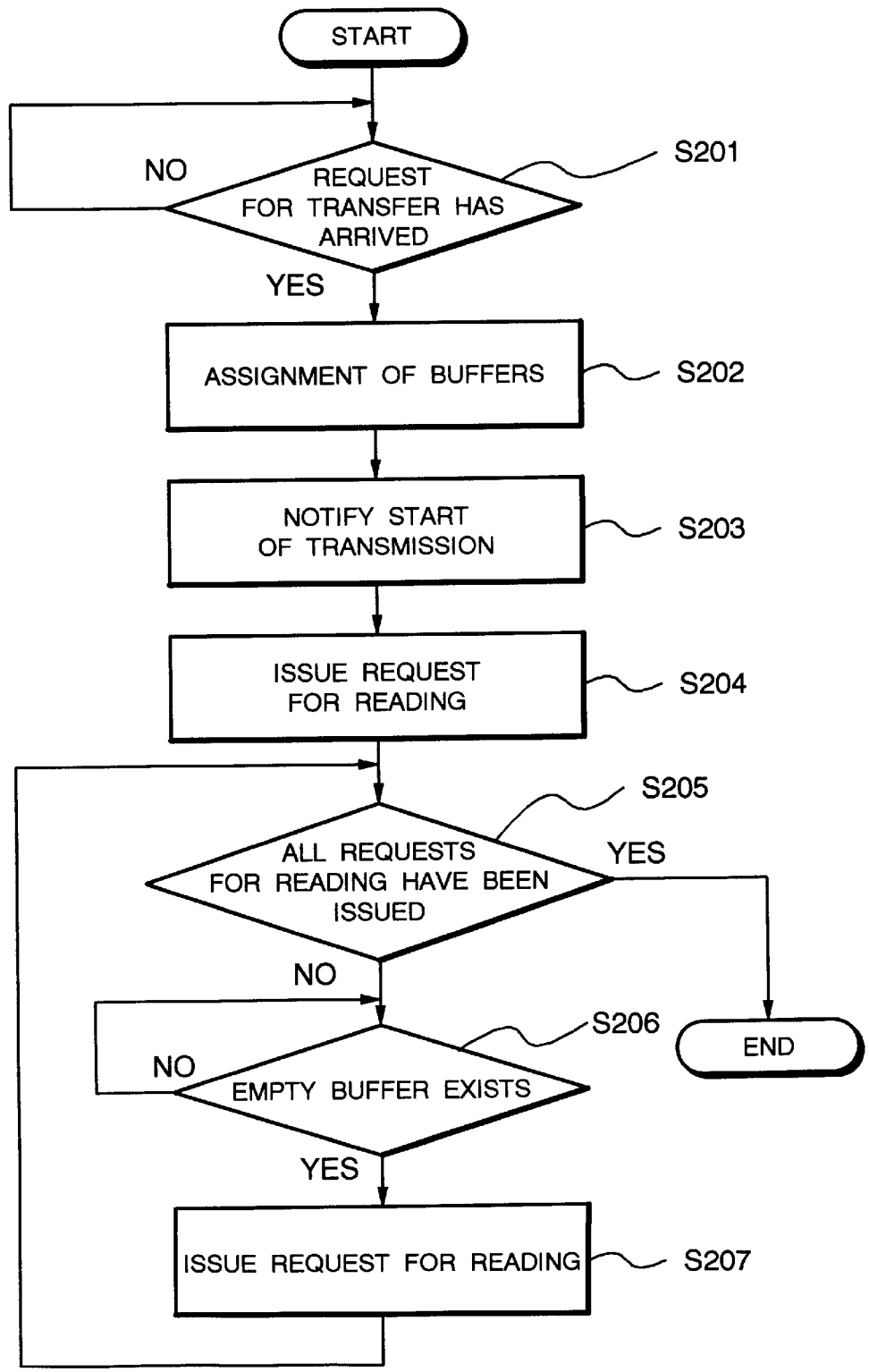
FIG. 2 is a flow chart showing operation of a read management unit conducted on a client basis according to the first embodiment.

With reference to FIG. 2, the read management unit 201 waits for a request for transfer from a client 100 as the initial state (Step S201) and upon arrival of the transfer request, the unit 201 stores information for transferring streams to the client 100 which has issued the transfer request and information regarding a file to be transferred and assigns a plurality of buffers of the transmission buffer 202 to the client 100 (Step S202). Then, the unit 201 notifies the data transfer unit 203 of the start of transfer (Step S203). Together with the notification of the start of transfer, the unit 201 also gives notification of information regarding a transmission buffer 202 where data to be transferred is to be stored, regarding the number of blocks to be transferred and regarding the client 100 as a destination of transfer.

Next, the unit 201 issues as many requests for reading data as the assigned buffers to the secondary storage unit 210 (Step S204). When the number of data to be transferred to the client 100 is smaller than the number of buffers assigned to the client 100, the unit 201 issues as many requests for reading data as blocks to be transferred at Step S204.

Next, the unit 201 determines whether all the requests for data reading related to the client 100 have been issued or not (Step S205) and when all the requests have been issued, ends processing regarding the client 100. On the other hand, when there remains a request for reading data yet to be issued, the unit 201 waits for a free space to be generated in the transmission buffer 202 assigned to the client 100 as a result of transfer of read data to the client 100 (Step S206). When a free space is generated in the transmission buffer 202, the unit 201 issues a request for reading to the secondary storage unit 210 (Step S207) to proceed to Step S205.

In the above processing, Step S203 can be conducted in parallel with Step S202 or Step S204. For the cyclic use in the order of transfer of data blocks, the transmission buffer 202 designates a buffer to store read data at the time of the issuance of a request for reading at Steps S204 and Step S207. Issuance of requests for data reading is conducted in the order of transfer of data blocks to the client 100.

The secondary storage unit 210 has a queue for managing a request for reading. Requests for data reading issued by the read management unit 201 are registered in the queue. Processing at the secondary storage unit 210 is shown in FIG. 3.

Figure 3:
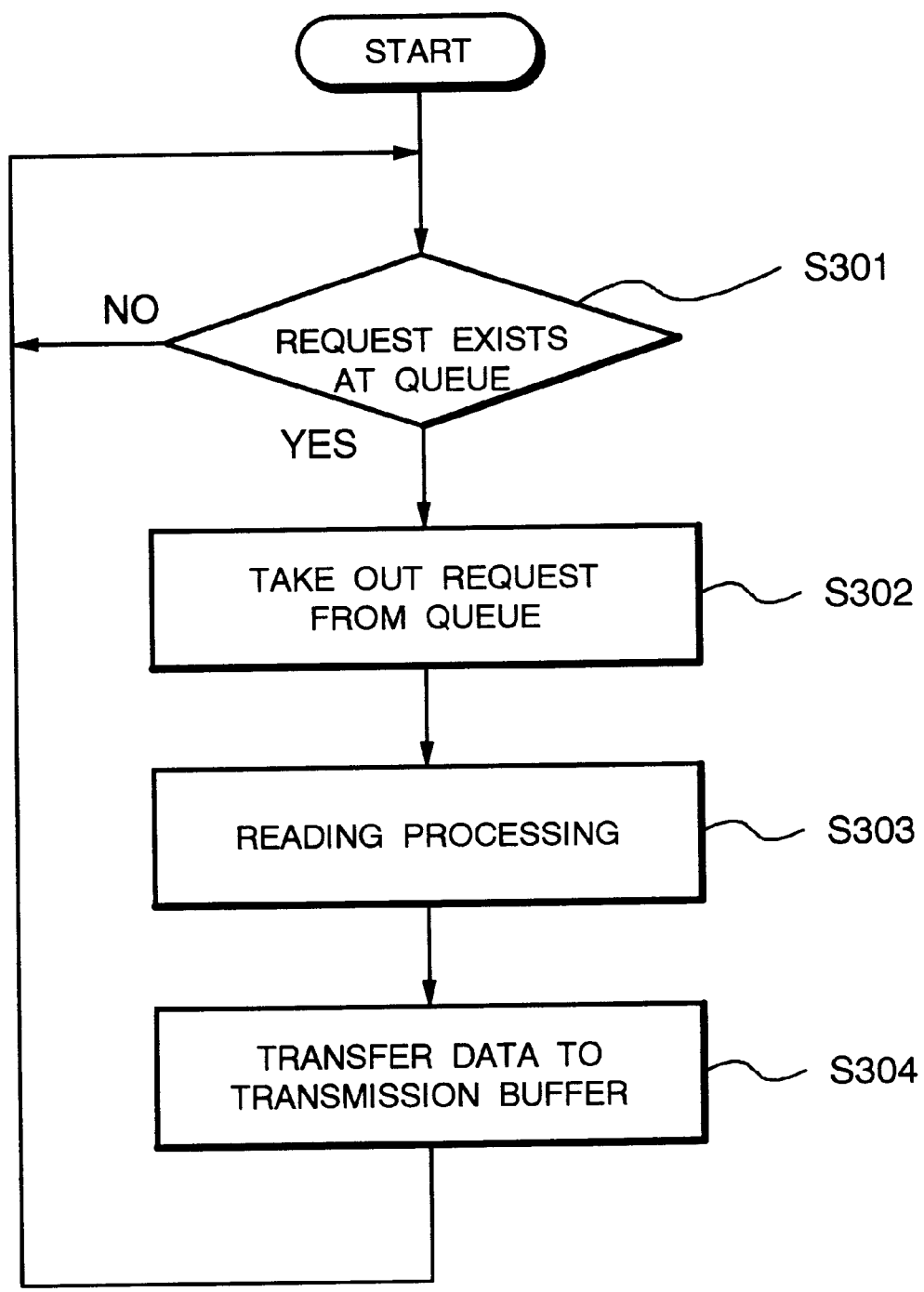
FIG. 3 is a flow chart showing operation of a secondary storage unit according to the first embodiment.

With reference to FIG. 3, the secondary storage unit 210, as the initial state, waits for a data reading request to be processed to come to the queue (Step S301). When a request for data reading to be processed is registered at the queue, the unit 210 takes out the request from the queue (Step S302). Then, the unit 210 reads a data block designated by the data reading request from a storage medium (Step S303) and transfers data to the transmission buffer 202 designated by the data reading request (Step S303). The secondary storage unit 210 repeatedly conducts the series of processing.

The data transfer unit 203 actually starts transfer after a lapse of a fixed time from the notification of transfer start from the read management unit 201. The unit 203 has a timer for counting the waiting time. The data transfer unit 203 manages, for each client 100, information regarding the clients 100, information about transfer such as information from which buffer of the transmission buffer 202 data is to be transferred, and the number of data blocks yet to be transferred. Processing at the data transfer unit 203 on a client 100 basis is shown in FIG. 4.

Figure 4:
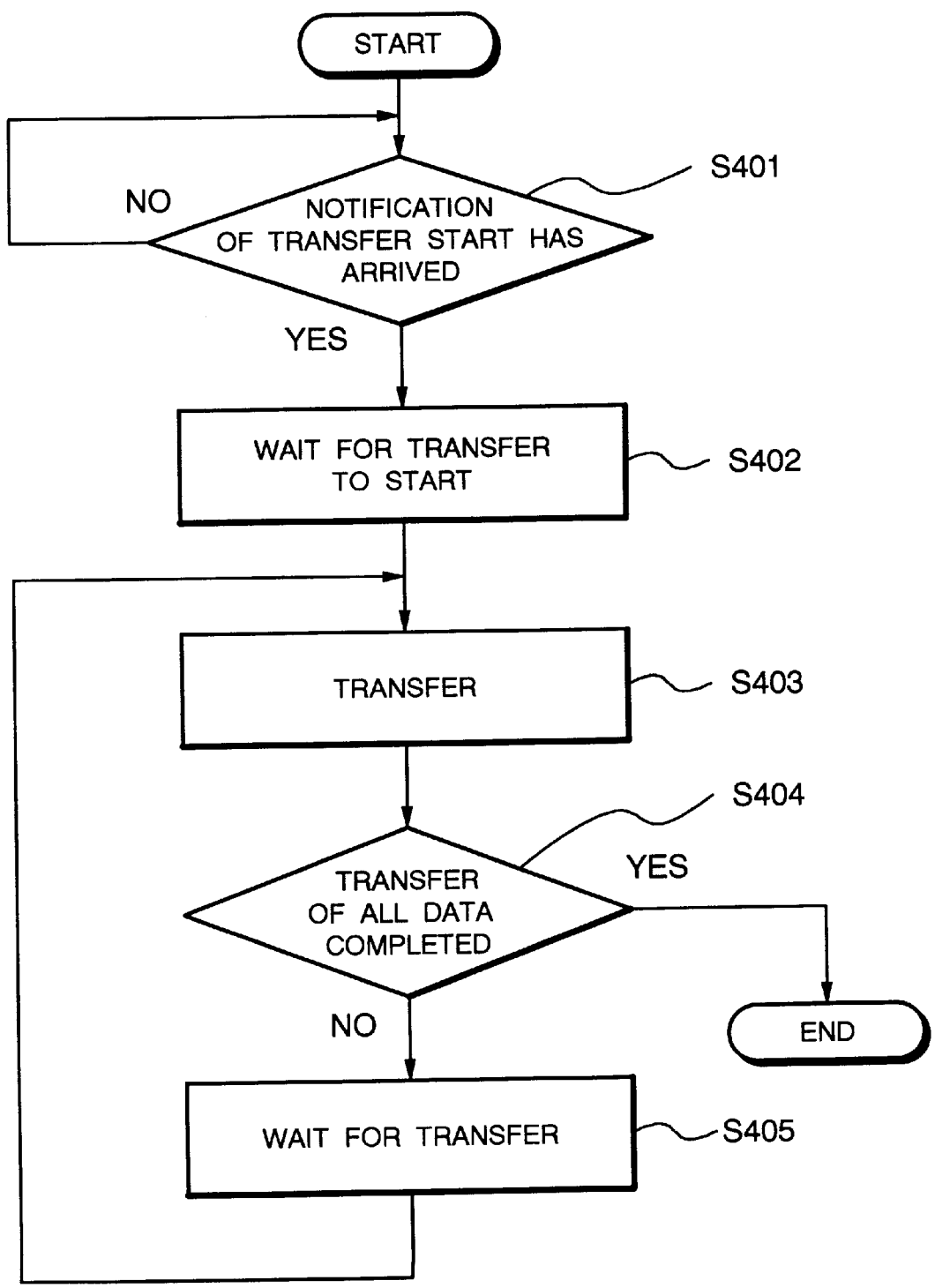
FIG. 4 is a flow chart showing operation of a data transfer unit conducted on a client basis according to the first embodiment.

With reference to FIG. 4, the data transfer unit 203, as the initial state, waits for a notification of transfer start from the read management unit 201 (Step S401) and when notified of transfer start, stores information and the transmission buffer 202 for transferring streams to the client 100 to wait for a period of fixed time (Tstart sec.) until transfer is started (Step S402). The unit 203 then transfers data from the transmission buffer 202 to the client 100 (Step S403). Next, the unit 203 determines whether transfer of all the data regarding the client 100 is completed or not (Step S404) and when it is completed, the unit 203 ends the processing related to the client 100. When it is not completed, the unit 203 waits for the timing of transfer of the next block data for t sec. (Step S405) to proceed to Step S403.

With respect to the i-th data counted from the start of reproduction, a time Ti from when a data reading request is issued until when the data is transferred to the client 100 is given by the following expression (1).

$$T_{res} = \begin{cases} T_{start} + t \times i & (0 \le i \le n) \\ t \times n & (i \ge n) \end{cases} \quad (1)$$

More specifically, representing, as Tres, a response time of the secondary storage unit from when the request for reading is issued until when the data is stored in the transmission buffer 202, data reading will be in time for the transfer when Tres<Ti is established. In addition, assuming that a number m of data reading requests have been processed at the secondary storage unit before a reading request is processed and that reading processing of the i-th data takes Ri sec., Tres is given by the following expression (2).

$$T_{res} = \sum_{i=0}^{m} R_i \quad (2)$$

As is clear from the expression (2), in a response time of the secondary storage unit, no variation is seen in time required for individual reading processing. Increasing the number n of buffers of the transmission buffer 202 per client 100 and a waiting time Tstart for transfer to start at the data transfer unit 203 results in making variation in time required for reading processing completely negligible, enabling time required for each reading processing to be regarded as a mean value thereof.

Figure 5:
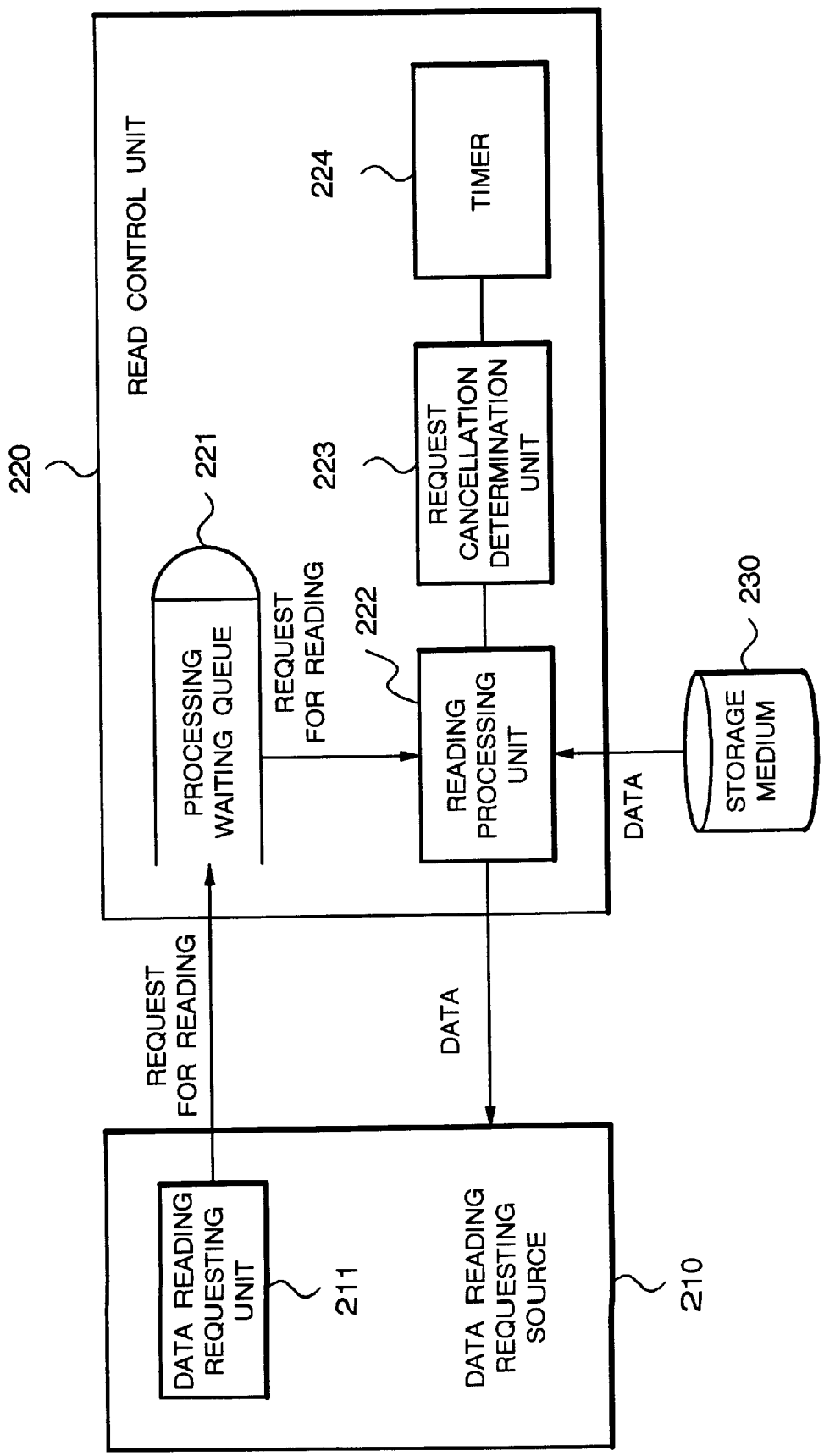
FIG. 5 is a block diagram showing example of structure of a secondary storage unit.

FIG. 5 is a block diagram showing structure of an embodiment of a secondary storage unit for use in the server unit of the stream transfer control system of the present embodiment. With reference to FIG. 5, the secondary storage unit of the present embodiment includes a read control unit 220 and a storage medium 230 and at the request for data reading from a data reading requesting source 210, sends desired data to the data reading requesting source 210. The data reading requesting source 210 includes a data reading requesting unit 211, while the read control unit 220 includes a processing waiting queue 221, a reading processing unit 222, a request cancellation determination unit 223 and a timer 224. The data reading requesting source 210 corresponds to the read management unit 201 and the data transfer unit 203 in the stream transfer control system illustrated in FIG. 1.

In the data reading requesting source 210, when at the time of issuance of a request for reading data, the time of expiration of a period is determined within which the data is validly used, the data reading requesting unit 211 issues a data reading request with the expiration time applied as a request cancellation time added thereto. The issued data reading request is sent to the read control unit 220.

The read control unit 220 registers an accepted data reading request at the processing waiting queue 221. Then, data reading from the storage medium 230 is conducted by the reading processing unit 222. Processing of the reading processing unit 222 is shown in FIG. 6.

Figure 6:
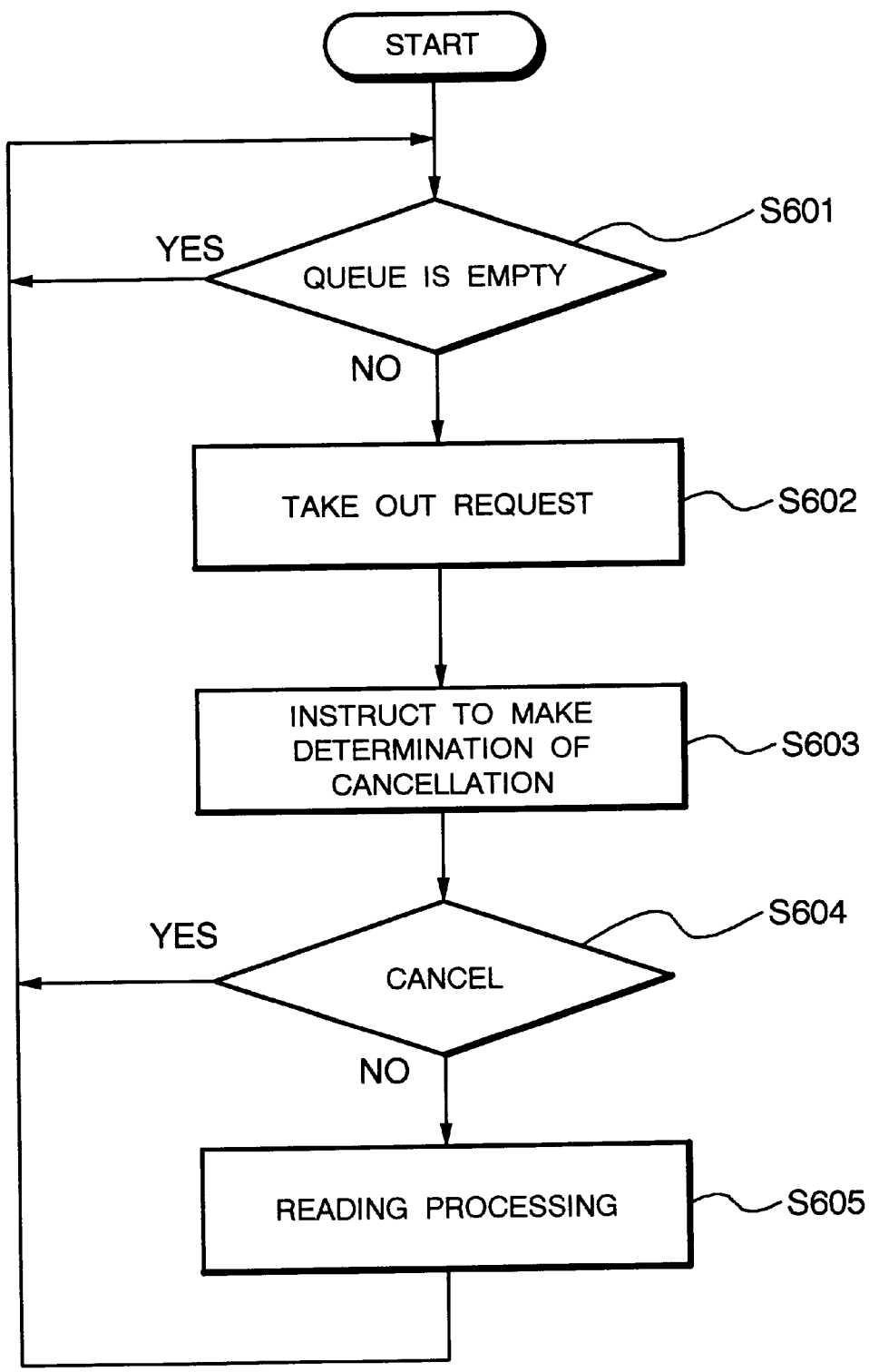
FIG. 6 is a flow chart showing operation of a reading processing unit illustrated in FIG. 5.

With reference to FIG. 6, the reading processing unit 222 first confirms existence/non-existence of a request to be processed in the processing waiting queue 221 (Step S601). When a data reading request to be processed is registered at the processing waiting queue 221, the unit 222 takes out the data reading request from the processing waiting queue 221 (Step S602). Then, the unit 222 transfers a cancellation time applied to the data reading request to the request cancellation determination unit 223 to make determination of cancellation (Step S603). When determination is made by the request cancellation determination unit 223 that the data reading request is not to be canceled (N at Step S604), the unit 222 reads data designated by the request from the storage medium (Step S605) and transfer the data to the data reading requesting source 210. On the other hand, when determination is made that the data reading request is to be canceled (Y at Step S604), the routine skips the Step S605 to proceed to Step S601. Here, when instructed to make determination of cancellation by the reading processing unit 222, the request cancellation determination unit 223 refers to the timer 224 to obtain the current time Tcurrent and compare the same with the request cancellation time Tcancel transferred from the reading processing unit 222. Then, when Tcurrent>Tcancel is established, determination is made that the data reading request is to be canceled.

When a time of reading processing of the data from the storage medium 230 conducted at the secondary storage unit thus exceeds a time designated by the data reading requesting source 210, the data reading processing can be canceled. Among possible secondary storage units to which such structure as mentioned above is applied are a magnetic disk device, an optical disk device and a disk array device. In addition, the read control unit 220 may be provided within the secondary storage unit or at a controller part of an interface, of a computer to which a secondary storage unit is connected, with the secondary storage unit. In either case, the above-described effect can be achieved.

Figure 7:
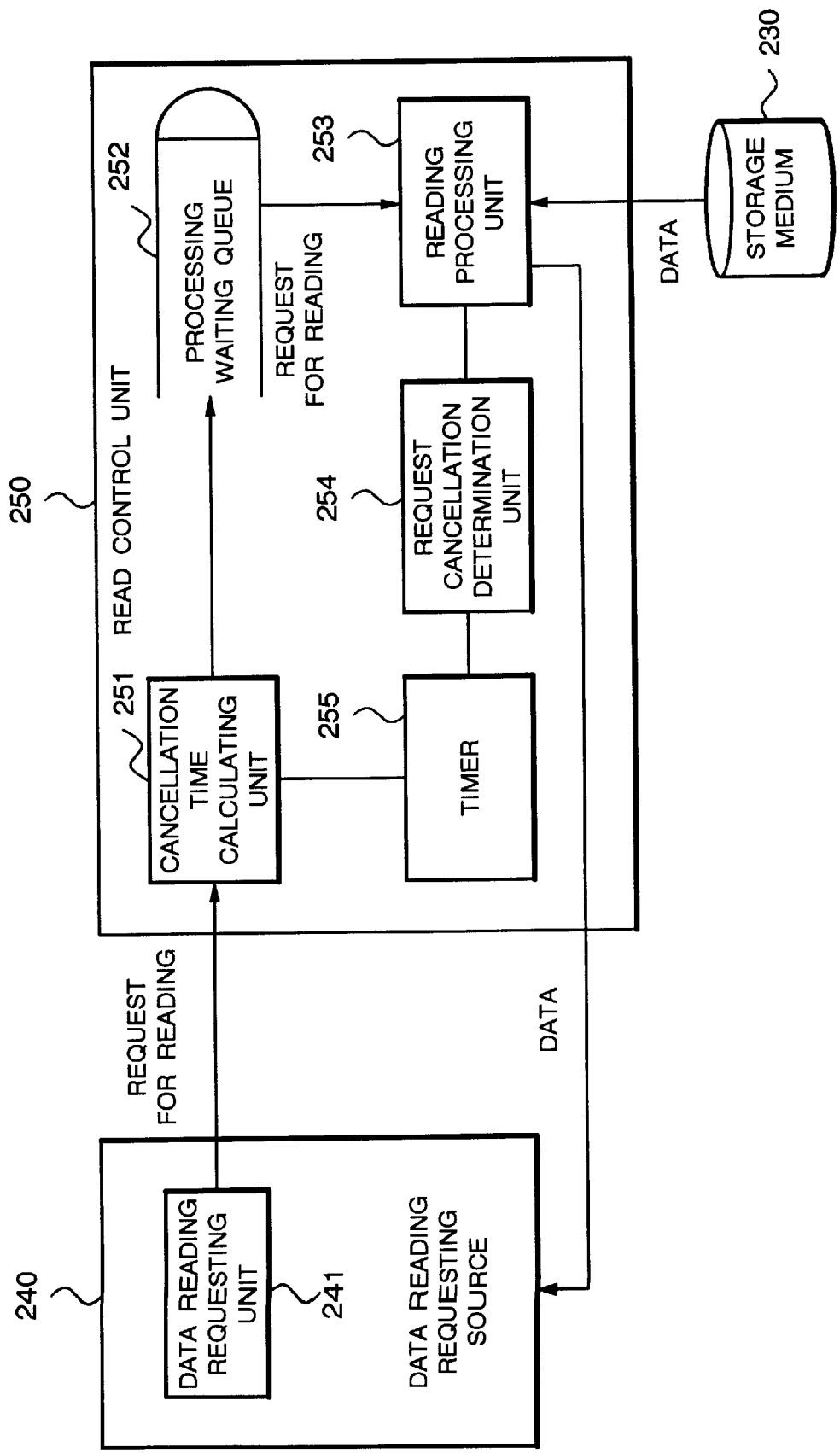
FIG. 7 is a block diagram showing another example of structure of a secondary storage unit.

FIG. 7 is a block diagram showing structure of another embodiment of a secondary storage unit for use in the server unit of the stream transfer control system of the present embodiment. With reference to FIG. 7, the secondary storage unit of the present embodiment includes a read control unit 250 and a storage medium 230 and at the request for data reading from a data reading requesting source 240, sends desired data to the data reading requesting source 240. The data reading requesting source 240 includes a data reading requesting unit 241, while the read control unit 250 includes a processing waiting queue 252, a reading processing unit 253, a request cancellation determination unit 254, a timer 255 and a cancellation time calculating unit 251.

The data reading requesting source 240 corresponds to the read management unit 201 and the data transfer unit 203 in the stream transfer control system illustrated in FIG. 1. The processing conducted by the reading processing unit 253 and the request cancellation determination unit 254 shown in FIG. 7 is the same as that by the reading processing unit 222 and the request cancellation determination unit 223 in the embodiment described with reference to FIG. 5.

In the data reading requesting source 240, when at the time of issuance of a request for reading data, a time period is determined within which the data is validly used, the data reading requesting unit 241 issues a data reading request with the determined valid time period as a request cancellation time period added thereto. The issued data reading request is sent to the read control unit 250.

The read control unit 250 sends an accepted data reading request to the cancellation time calculating unit 251 to calculate a cancellation time of the data reading request. Processing of the cancellation time calculating unit 251 is shown in FIG. 8.

Figure 8:
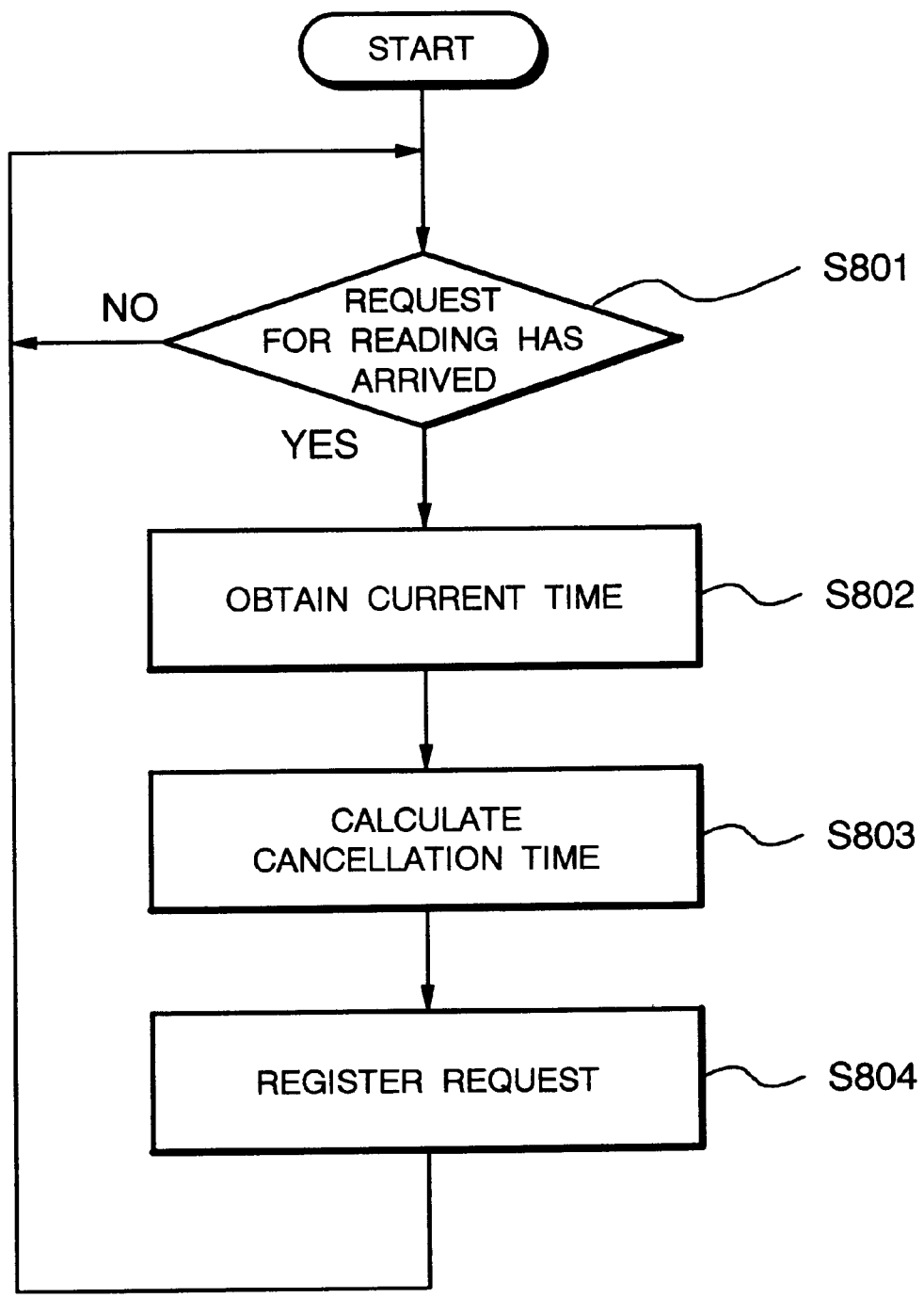
FIG. 8 is a flow chart showing operation of a cancellation time calculating unit illustrated in FIG. 7.

With reference to FIG. 8, the cancellation time calculating unit 251, upon receiving a data reading request from the data reading requesting source 240, obtains the current time (Tcurrent) with reference to the timer 255 (Steps S801 and S802) and calculates a request cancellation time (Tcancel) as a time when the data reading request is to be canceled based on the obtained current time and a request cancellation time period (tcancel) applied to the data reading request according to the following expression (3) (Step S803).

$$T_{cancel} = T_{curent} + t_{cancel} \qquad (3)$$

Then, the unit 251 registers the reading request with the calculated request cancellation time applied thereto at the processing waiting queue 252 (Step S804).

When a time of reading processing of the data from the storage medium 230 conducted at the secondary storage unit thus exceeds a time designated by the data reading requesting source 240, the data reading processing can be canceled. Among possible secondary storage units to which such structure as mentioned above is applied are a magnetic disk device, an optical disk device, and a disk array device. In addition, the read control unit 250 may be provided within the secondary storage unit or at a controller part of an interface, of a computer to which a secondary storage unit is connected, with the secondary storage unit. In either case, the above-described effect can be achieved.

Figure 9:
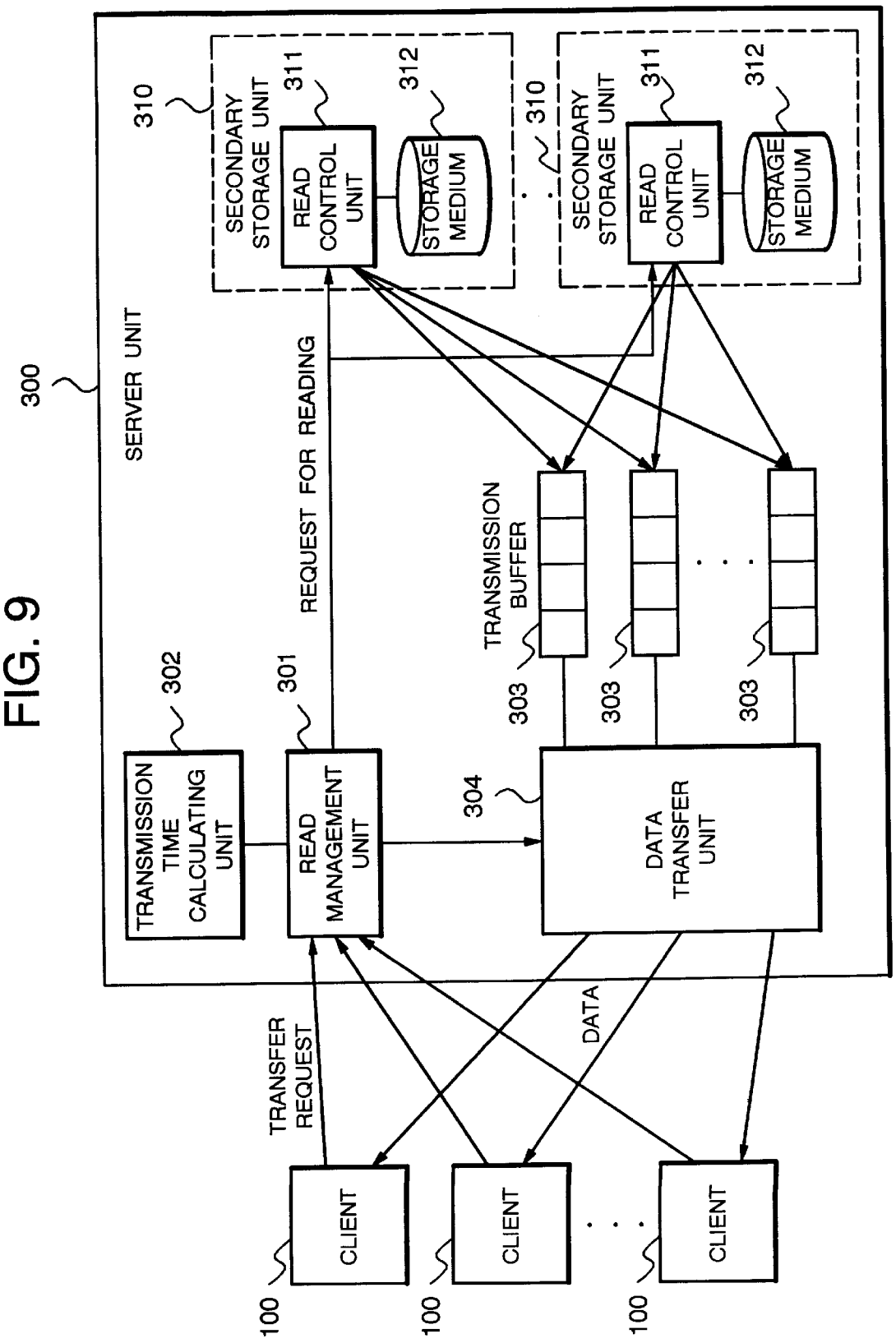
FIG. 9 is a block diagram showing structure of a stream transfer control system according to a second embodiment of the present invention.

FIG. 9 is a block diagram showing structure of a stream transfer control system according to a second embodiment of the present invention. With reference to FIG. 9, the stream transfer control system of the present embodiment includes a server unit 300 and a plurality of clients 100 connected to the server unit 300 through a network. The server unit 300 includes a read management unit 301, a transmission time calculating unit 302, a transmission buffer 303, at least one secondary storage unit 310 and a data transfer unit 304. The secondary storage unit 310 is composed of a read control unit 311 and a storage medium 312. Stored in the storage medium 312 are files in which streams (e.g. video data and voice data) are recorded. The file is divided, for example, into data blocks of fixed length.

In thus structured present embodiment, the transmission buffer unit 303 and the data transfer unit 304 of the server unit 300 are the same as the transmission buffer unit 202 and the data transfer unit 203 of the server unit 200 in the stream transfer control system according to the first embodiment shown in FIG. 1. In addition, the processing by the read control unit 311 of the secondary storage unit 310 is the same as that by the read control unit 220 in the secondary storage unit shown in FIG. 5. More specifically, the read control unit 311 compares a request cancellation time designated by a data reading request issued from the read management unit 301 as a data reading requesting source with the current time to determine whether the data reading request is to be canceled or not and only when the determination is not made that the request is to be canceled, conducts the processing of reading data from the storage medium 312 and stores the data in the relevant transmission buffer 303.

In the server unit 300, the read management unit 301 receives a transfer request from the client 100, as well as managing, for each client 100, information regarding the secondary storage unit 310 from which data is to be read, information for issuing block offset of read data and information regarding a data reading request yet to be issued. Processing conducted at the read management unit 301 on a client 100 basis is shown in FIG. 10.

Figure 10:
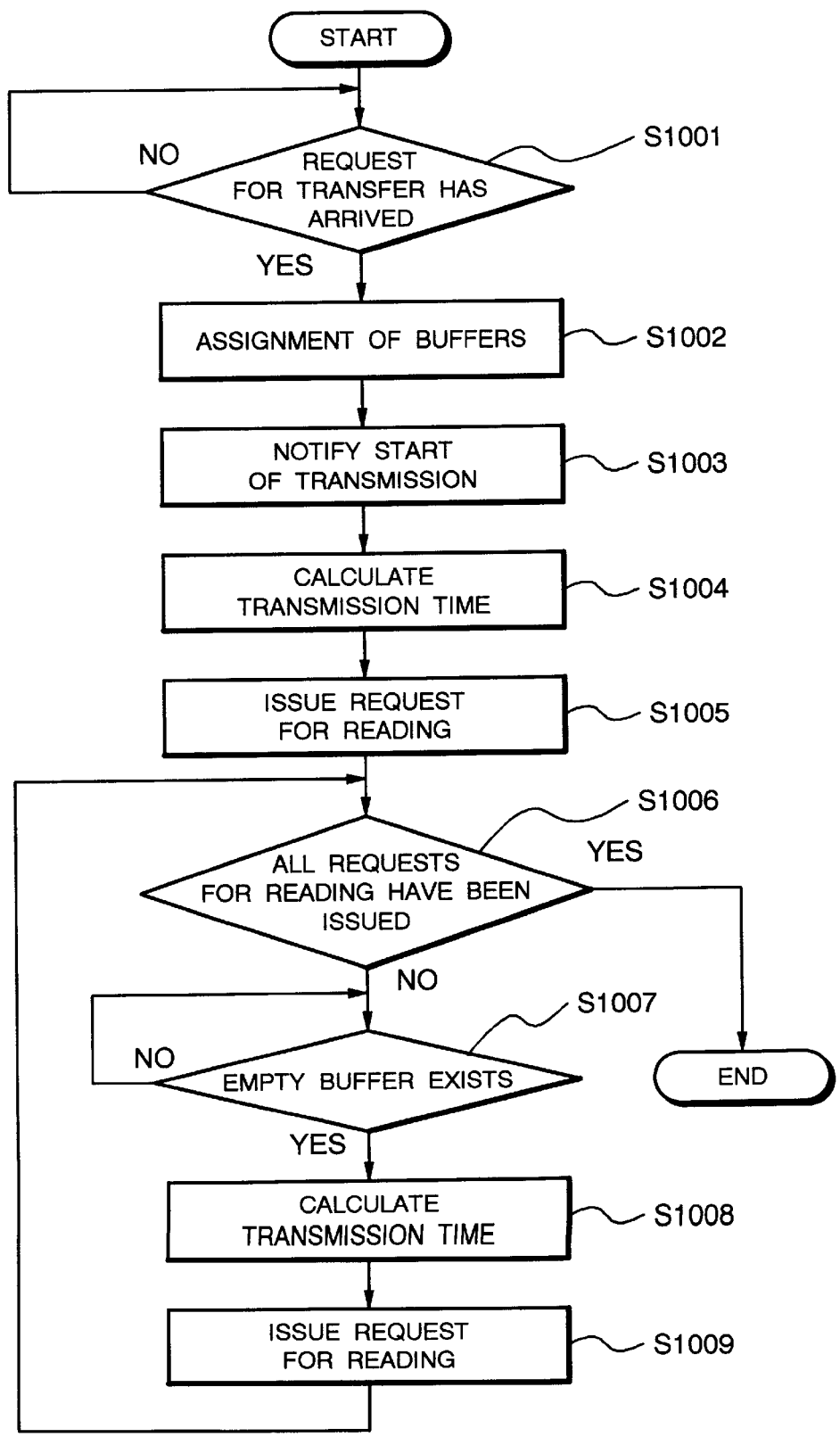
FIG. 10 is a flow chart showing operation of a read management unit according to the second embodiment.

With reference to FIG. 10, the read management unit 301 waits for a request for reproduction from a client 100 as the initial state (Step S1001) and upon arrival of the transfer request, stores information for transferring streams to the client 100 which has issued the transfer request and information regarding a file to be transferred and assigns a plurality of buffers of the transmission buffer 303 to the client 100 (Step S1002). Then, the unit 301 notifies the data transfer unit 304 of the start of transfer (Step S1003). Together with the notification of the start of transfer, the unit 301 also gives notification of information regarding a transfer buffer 303 where data to be transferred is to be stored, regarding the number of blocks to be transferred and regarding the client 100 as a destination of transfer.

Next, the unit 301 causes the transmission time calculating unit 302 to calculate a transmission time of each of as many data reading processing as assigned buffers (Step S1004). Then, the unit 301 assigns the transmission times calculated by the transmission time calculating unit 302 as a request cancellation time to the data reading requests and issues as many data reading requests as assigned buffers to the secondary storage unit 310 (Step S1005). When the number of data to be transferred to the client 100 is smaller than the number of buffers assigned to the client 100, the unit 301 issues as many data reading requests as blocks to be transferred at Step S1005.

Next, the unit 301 determines whether all the requests for data reading related to the client 100 have been issued or not (Step S1006) and when all the requests have been issued, ends processing regarding the client 100. On the other hand, when there remains a request for reading data yet to be issued, the unit 301 waits for a free space to be generated in the transmission buffer 303 assigned to the client 100 as a result of transfer of read data to the client 100 (Step S1007). When a free space is generated in the transmission buffer 303, the unit 301 causes the transmission time calculating unit 302 to calculate a transmission time (Step S1008), adds the transmission time as a request cancellation time to the data reading request and issues the request to the secondary storage unit 310 (Step S1009) to proceed to Step S1006.

In the above processing, Step S1003 can be conducted in parallel with Step S1002 or Step S1004. Issuance of data reading requests is sequentially conducted in the order of transfer of data blocks to the client 100. A transmission time $S_i$ of the i-th data calculated by the transmission time calculating unit 302 is given by the following expression (4), assuming that the number of buffers of the transmission buffer 303 assigned to the client 100 is denoted as n, a time at the data transfer unit 304 from the arrival of a notification of transfer start until start of transfer denoted as Tstart sec., an interval of data transfer at the data transfer unit 304 as t sec. and a time of issuing a reading request as Tcurrent.

$$S_i = \begin{cases} T_{current} + T_{start} + t \times i & (0 \le i \le n) \\ T_{current} + t \times n & (i \ge n) \end{cases} \quad (4)$$

The read control unit 311 of the secondary storage unit 310 compares the request cancellation time designated by the data reading request from the read management unit 301 with the current time to determine to cancel the request when the request cancellation time is past the current time and otherwise conduct reading processing of data from the storage medium 312 and store the data in the relevant transmission buffer 303.

Selective data reading processing thus conducted at the secondary storage unit 310 by using a request cancellation time prevents reading of useless data which will not be used at the client 100.

Figure 11:
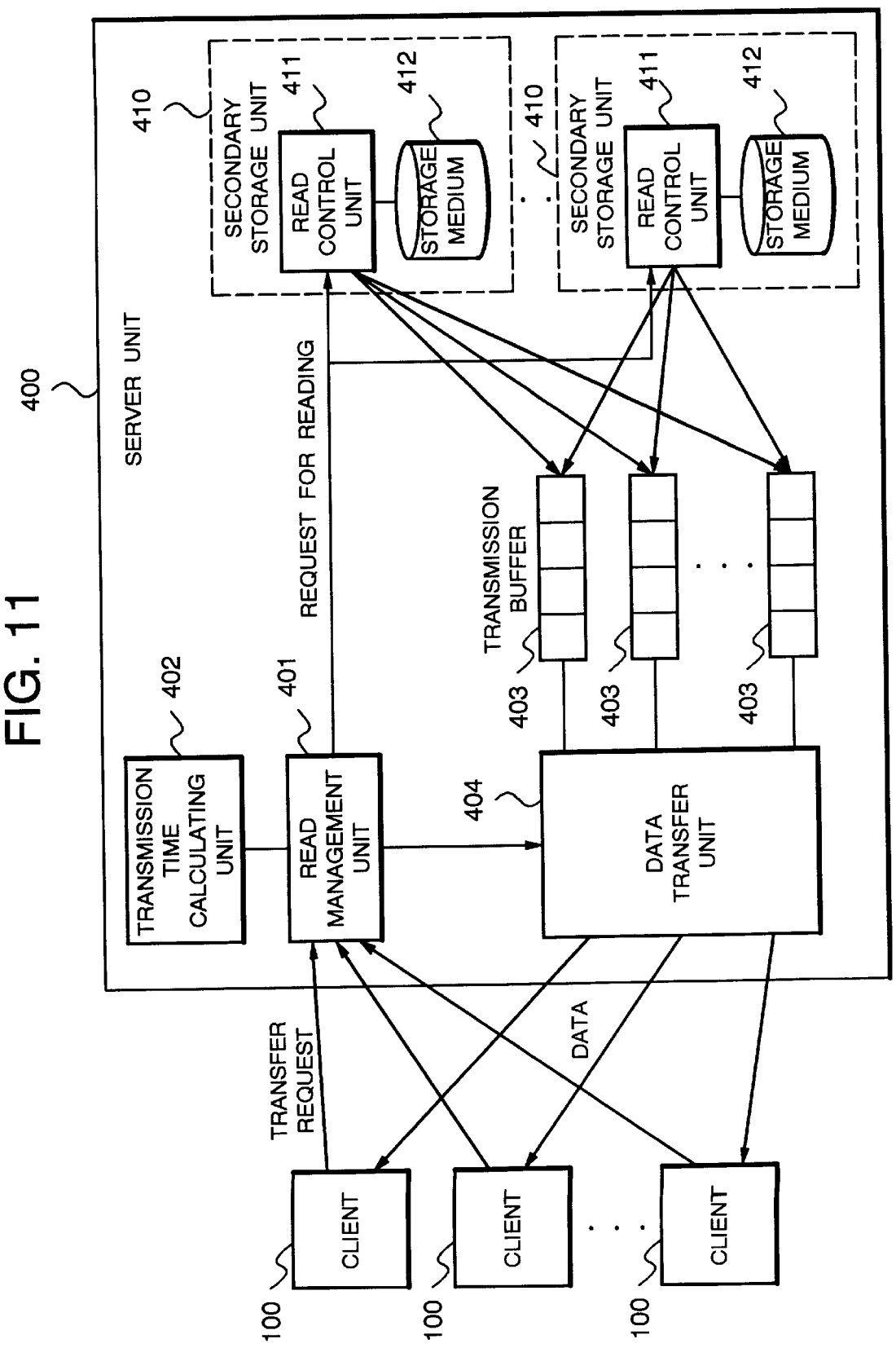
FIG. 11 is a block diagram showing structure of a stream transfer control system according to a third embodiment of the present invention.

FIG. 11 is a block diagram showing structure of a stream transfer control system according to a third embodiment of the present invention. With reference to FIG. 11, the stream transfer control system of the present embodiment includes a server unit 400 and a plurality of clients 100 connected to the server unit 400 through a network. The server unit 400 includes a read management unit 401, a transmission time period calculating unit 402, a transmission buffer 403, at least one secondary storage unit 410 and a data transfer unit 404. The secondary storage unit 410 is composed of a read control unit 411 and a storage medium 412. Stored in the storage medium 412 are files in which streams (e.g. video data and voice data) are recorded. The file is divided, for example, into data blocks of fixed length.

In thus structured present embodiment, the transmission buffer 403 and the data transfer unit 404 of the server unit 400 are the same as the transmission buffer 202 and the data transfer unit 203 of the server unit 200 in the stream transfer control system according to the first embodiment shown in FIG. 1. In addition, the processing by the read control unit 411 of the secondary storage unit 410 is the same as that by the read control unit 250 in the secondary storage unit shown in FIG. 7. More specifically, the read control unit 411 compares a request cancellation time designated by a data reading request issued from the read management unit 401 as a data reading requesting source with the current time to determine whether the data reading request is to be canceled or not and only when the determination is not made that the request is to be canceled, conducts the processing of reading data from the storage medium 412 and stores the data in the relevant transmission buffer 403.

In the server unit 400, the read management unit 401 receives a transfer request from the client 100, as well as managing, for each client 100, information regarding the secondary storage unit 410 from which data is to be read, information for issuing block offset of read data and information regarding a data reading request yet to be issued. Processing conducted at the read management unit 401 on a client 100 basis is shown in FIG. 12.

Figure 12:
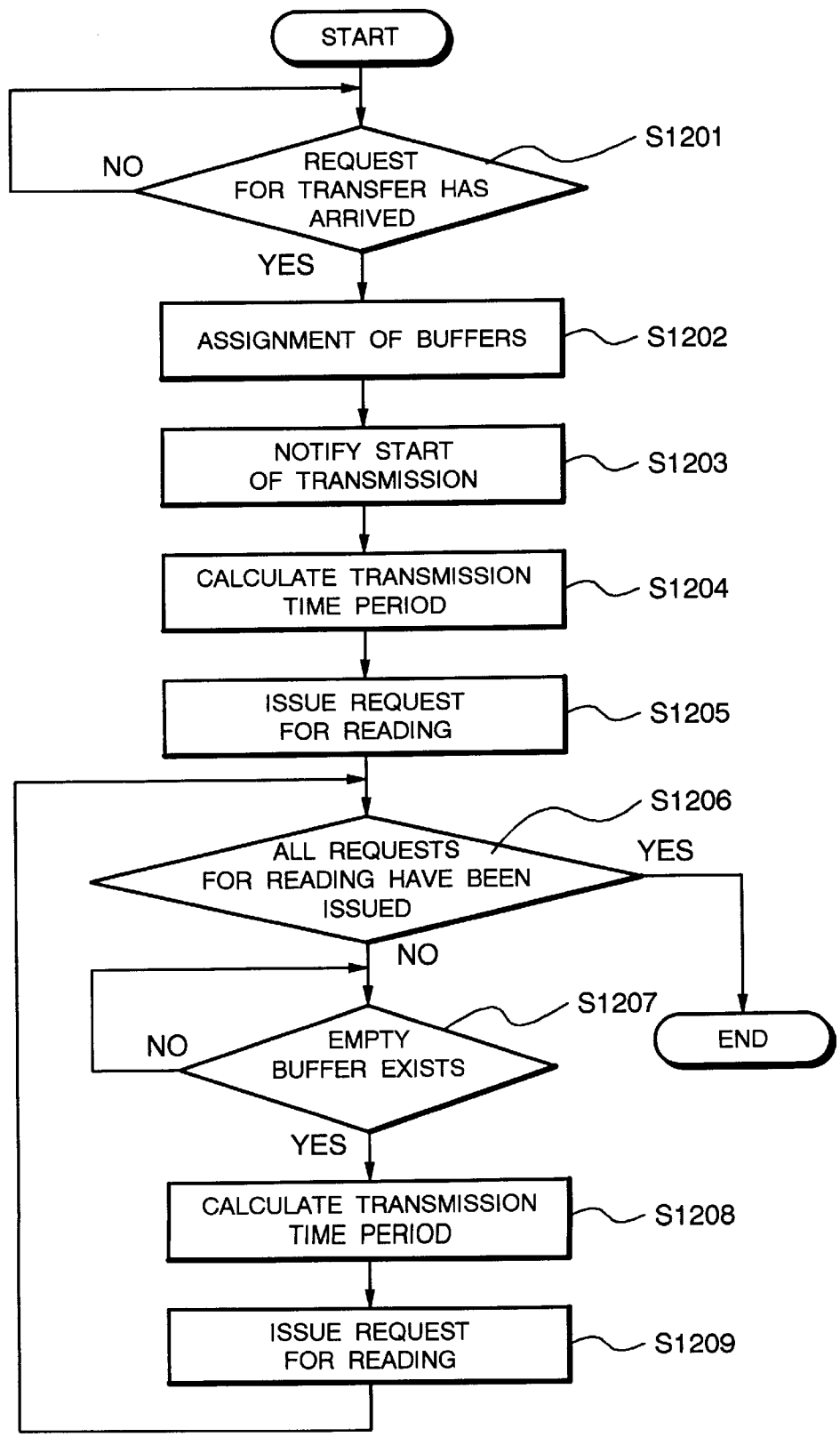
FIG. 12 is a flow chart showing operation of a read management unit according to the third embodiment.

With reference to FIG. 12, the read management unit 401 waits for a request for transfer from a client 100 as the initial state (Step S1201) and upon arrival of the transfer request, stores information for transferring streams to the client 100 which has issued the transfer request and information regarding a file to be transferred and assigns a plurality of buffers of the transmission buffer 403 to the client 100 (Step S1202). Then, the unit 401 notifies the data transfer unit 404 of the start of transfer (Step S1203). Together with the notification of the start of transfer, the unit 401 also gives notification of information regarding a transfer buffer 403 where data to be transferred is to be stored, regarding the number of blocks to be transferred and regarding the client 100 as a destination of transfer.

Next, the unit 401 causes the transmission time period calculating unit 402 to calculate an allowable time period (transmission time period) before read data is transmitted with respect to each of as many data reading processing as assigned buffers (Step S1204). Then, the unit 401 applies the calculated transmission time period as a request cancellation time period to the data reading request and issues as many requests for reading data as assigned buffers to the secondary storage unit 410 (Step S1205). When the number of data to be transferred to the client 100 is smaller than the number of buffers assigned to the client 100, the unit 401 issues as many data reading requests as blocks to be transferred at Step S1205.

Next, the unit 401 determines whether all the requests for data reading related to the client 100 have been issued or not (Step S1206) and when all the requests have been issued, ends processing regarding the client 100. On the other hand, when there remains a request for reading data yet to be issued, the unit 401 waits for a free space to be generated in the transmission buffer 403 assigned to the client 100 as a result of transfer of read data to the client 100 (Step S1207). When a free space is generated in the transmission buffer 403, the unit 401 causes the transmission time period calculating unit 402 to calculate a transmission time period (Step S1208), applies the transmission time period as a request cancellation time period to the data reading request and issues the request to the secondary storage unit 410 (Step S1209) to proceed to Step S1206.

In the above processing, Step S1203 can be conducted in parallel with Step S1202 or Step S1204. Issuance of data reading requests is sequentially conducted in the order of transfer of data blocks to the client 100. A transmission time period si of the i-th data calculated by the transmission time period calculating unit 402 is given by the following expression (5), assuming that the number of buffers of the transmission buffer 403 assigned to the client 100 is denoted as n, a time period at the data transfer unit 404 from the arrival of a notification of transfer start until start of transfer denoted as Tstart sec., and an interval of data transfer at the data transfer unit 404 as t sec.

$$S_i = \begin{cases} T_{start} + t \times i & (0 \leq i \leq n) \\ t \times n & (i \geq n) \end{cases} \quad (5)$$

The read control unit 411 of the secondary storage unit 410 converts the request cancellation time period designated by the data reading request from the read management unit 401 into a request cancellation time and compares the same with the current time to determine whether the data reading request is to be canceled or not. Only when the determination is not made that the request is to be canceled, the unit 411 conducts the processing of reading data from the storage medium 412 and stores the data in the relevant transmission buffer 403.

Selective data reading processing thus conducted at the secondary storage unit 410 by using a request cancellation time period prevents reading of useless data which will not be used at the client 100.

Figure 13:
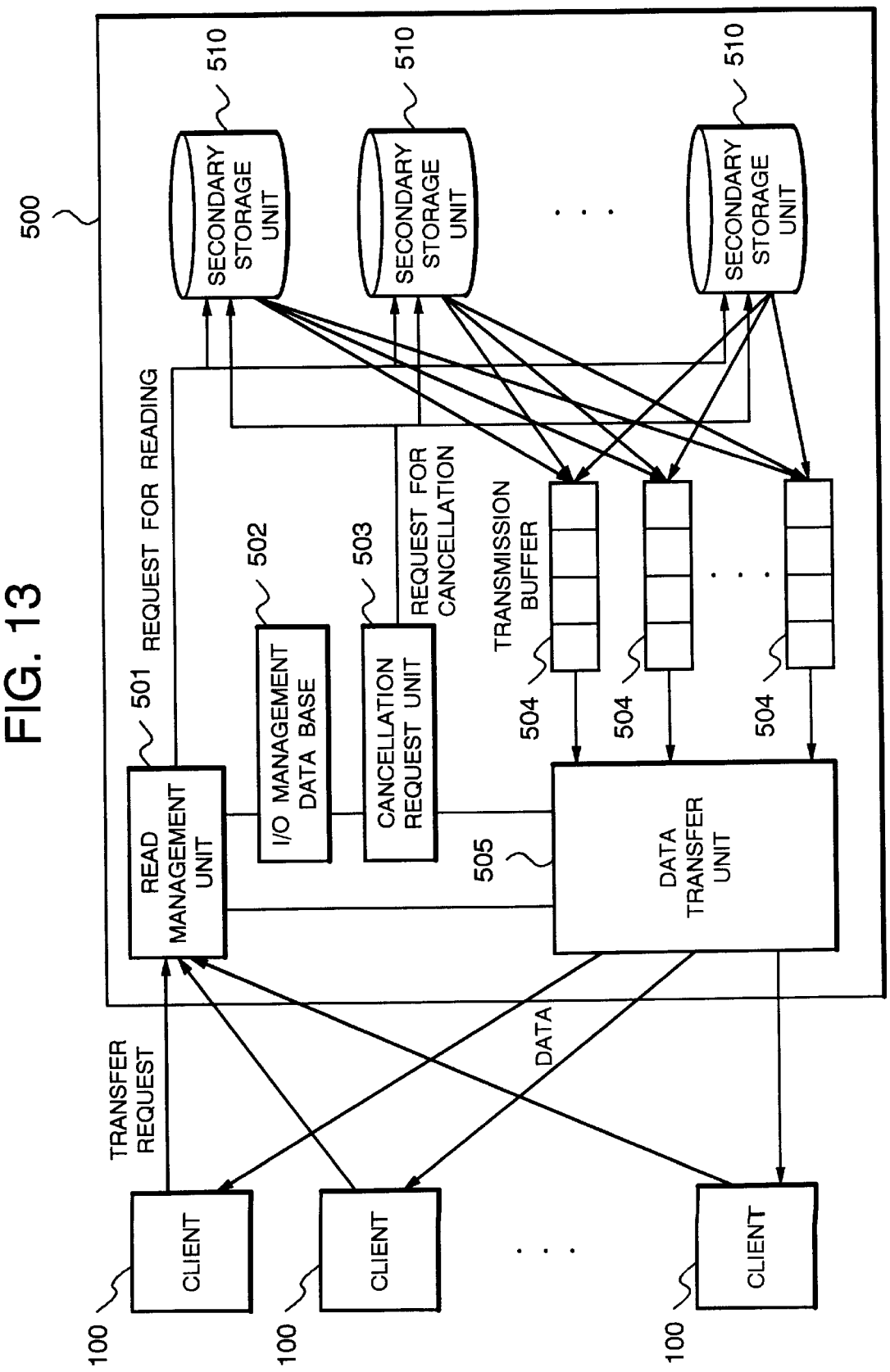
FIG. 13 is a block diagram showing structure of a stream transfer control system according to a fourth embodiment of the present invention.

FIG. 13 is a block diagram showing structure of a stream transfer control system according to a fourth embodiment of the present invention. With reference to FIG. 13, the stream transfer control system of the present embodiment includes a server unit 500 and a plurality of clients 100 connected to the server unit 500 through a network. The server unit 500 includes a read management unit 501, an I/O management unit 502, a cancellation request unit 503, a transmission buffer 504, at least one secondary storage unit 510 and a data transfer unit 505. Stored in the secondary storage unit 510 are files in which streams (e.g. video data and voice data) are recorded. The file is divided, for example, into data blocks of fixed length.

In thus structured present embodiment, the transmission buffer 504 of the server unit 500 is the same as the transmission buffer 202 of the server unit 200 in the stream transfer control system according to the first embodiment shown in FIG. 1. In addition, reading processing conducted at the secondary storage unit 510 is the same as that at the secondary storage unit 210 in the first embodiment shown in FIG. 1, with the only difference being that the secondary storage unit 510 individually manages various requests including a data reading request based on identifiers corresponding to the individual requests. Then, upon receiving a cancellation request with a designated identifier, the unit 510 conducts cancellation processing of the request corresponding to the identifier. The I/O management data base 502 records, in pairs, an identifier corresponding to each of the various requests issued to the secondary storage unit 510 and a buffer in which data read from the secondary storage unit 510 is to be stored.

In the server unit 500, the read management unit 501 receives a transfer request from the client 100, as well as managing, for each client 100, information regarding the secondary storage unit 510 from which data is to be read, information for issuing block offset of read data and information regarding a data reading request yet to be issued. Processing conducted at the read management unit 501 on a client 100 basis is shown in FIG. 14.

Figure 14:
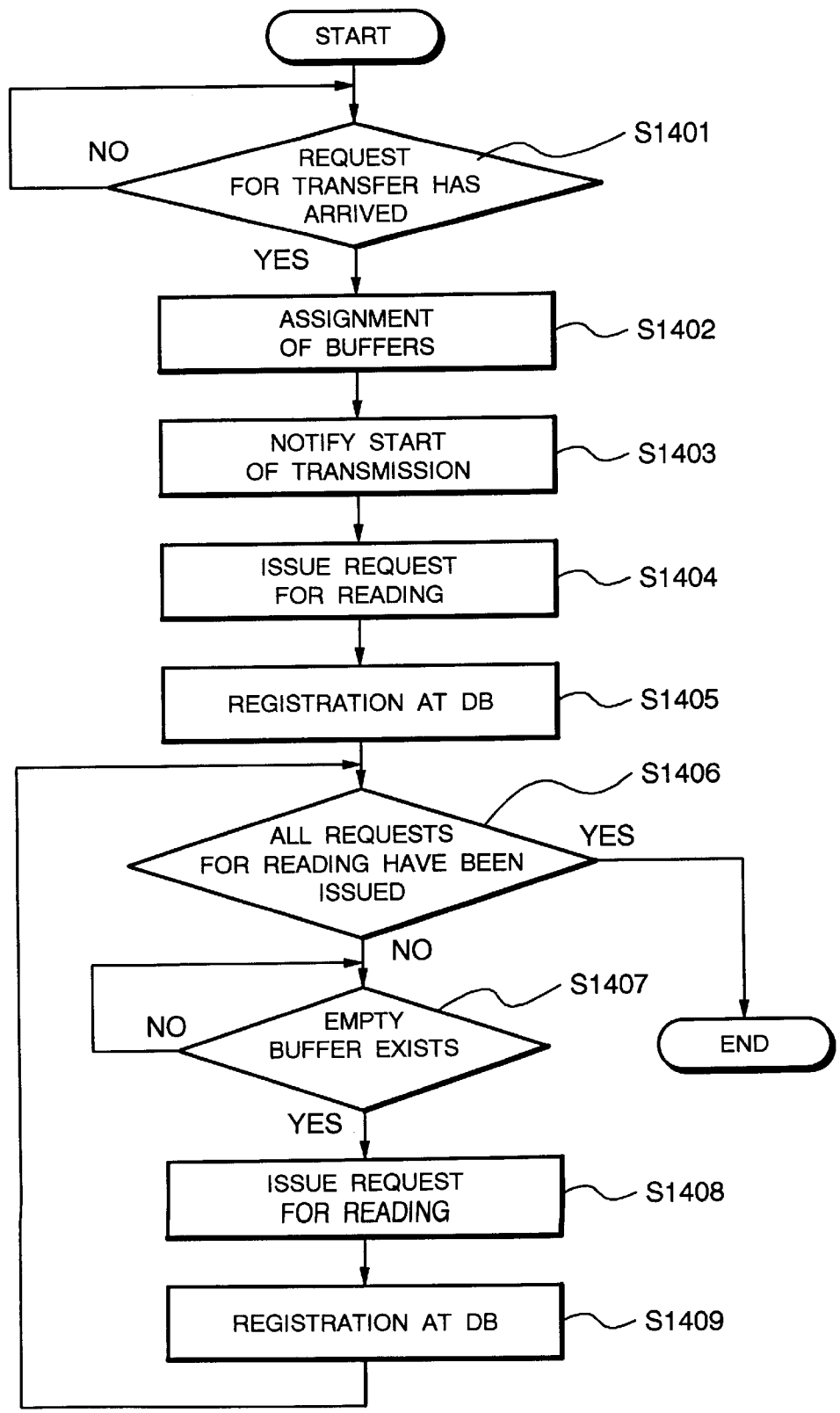
FIG. 14 is a flow chart showing operation of a read management unit according to the fourth embodiment.

With reference to FIG. 14, the read management unit 501 waits for a request for transfer from a client 100 as the initial state (Step S1401). Upon arrival of the transfer request, the unit 501 stores information for transferring streams to the client 100 which has issued the transfer request and information regarding a file to be transferred and assigns a plurality of buffers of the transmission buffer 504 to the client 100 (Step S1402). Then, the unit 501 notifies the data transfer unit 505 of the start of transfer (Step S1403). Together with the notification of the start of transfer, the unit 501 also gives notification of information regarding the transfer buffer 504 where data to be transferred is to be stored, regarding the number of blocks to be transferred and regarding the client 100 as a destination of transfer.

Next, the unit 501 issues as many requests for reading data as assigned buffers to the secondary unit 510 (Step S1404). When the number of data to be transferred to the client 100 is smaller than the number of buffers assigned to the client 100, the unit 501 issues as many data reading requests as blocks to be transferred at Step S1404. Then, the unit 501 registers information related to all the issued data reading requests at the I/O management data base 502 (Step S1405).

Next, the unit 501 determines whether all the requests for data reading related to the client 100 have been issued or not (Step S1406) and when all the requests have been issued, ends processing regarding the client 100. On the other hand, when there remains a request for reading data yet to be issued, the unit 501 waits for a free space to be generated in the transmission buffer 504 assigned to the client 100 as a result of transfer of read data to the client 100 (Step S1407). When a free space is generated in the transmission buffer 504, the unit 501 issues a data reading request to the secondary storage unit 510 (Step S1408) and registers information regarding the issued data reading request at the I/O management data base 502 (Step S1409) to proceed to Step S1406.

In the foregoing processing, Step S1403 can be executed in parallel with Step S1402 or S1404. In addition, for the cyclic use in the order of transfer of data blocks, the transmission buffer 504 designates a buffer to store read data at the time of issuance of a data reading request at Steps S1404 and S1408.

The data transfer unit 505 actually starts the transfer after a lapse of a fixed time from the notification of transfer start made by the read management unit 501. The unit 505 has a timer for counting the waiting time. The data transfer unit 505 manages, for each client 100, information regarding the client 100, information regarding from which buffer of the transmission buffer 504 data is to be transferred and information about the number of data blocks yet to be transferred. Processing at the data transfer unit 505 on a client 100 basis is shown in FIG. 15.

Figure 15:
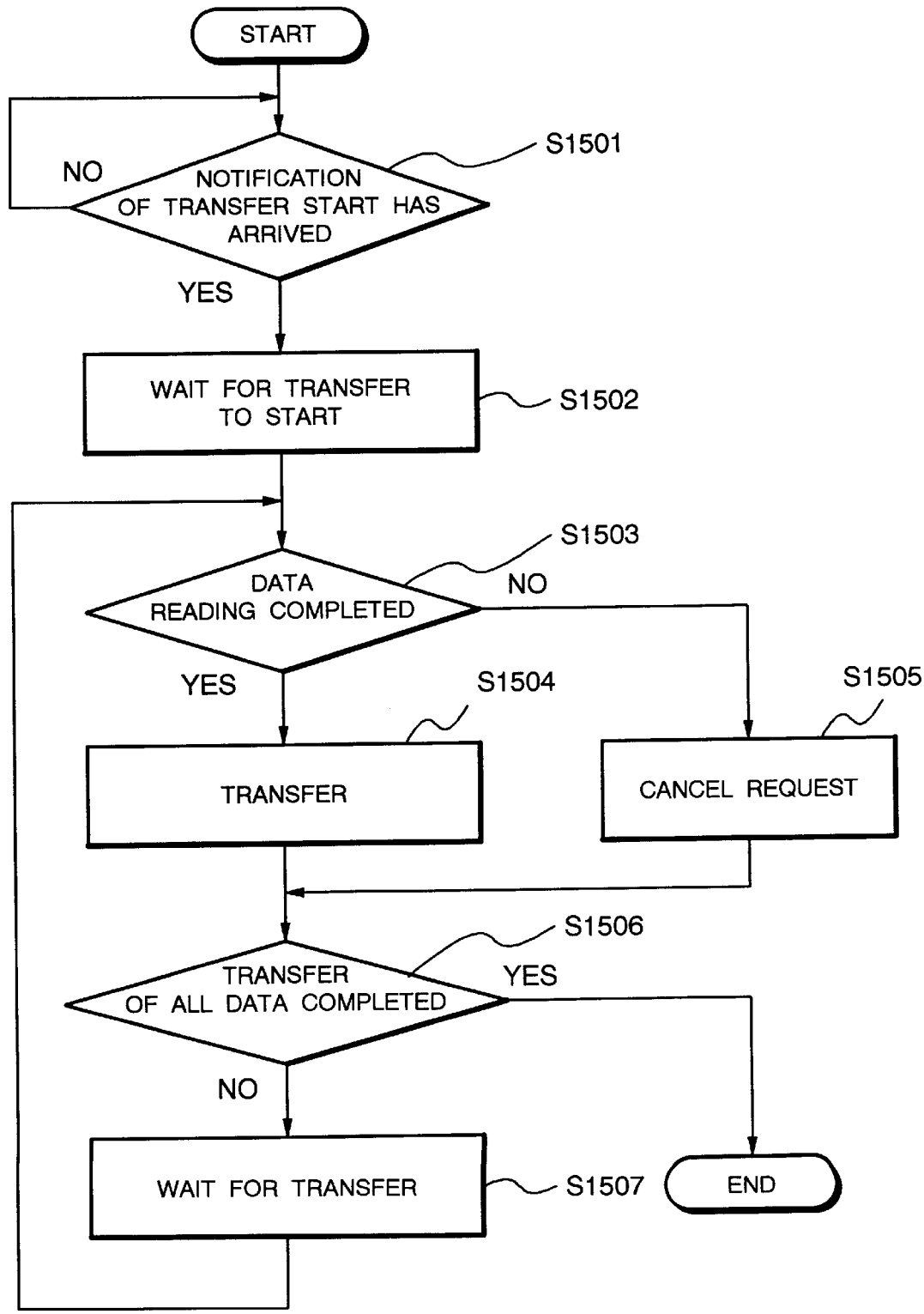
FIG. 15 is a flow chart showing operation of a data transfer unit according to the fourth embodiment.

With reference to FIG. 15, the data transfer unit 505, as the initial state, waits for the notification of transfer start from the read management unit 501 (Step S1501) and when notified of the transfer start, stores information for transferring streams to the client 100 and information about the transmission buffer 504 to be used to wait for a fixed time (Tstart sec.) until the transfer is started (Step S1502). Then, the unit 505 checks whether reading of data to be transmitted is completed (Step S1503) and if the data has been read, transfers the data to the client 100 from the transmission buffer 504 (Step S1504). On the other hand, if the data is yet to be read, the unit 505 empties the buffer which should have stored the data to be transmitted and issues a notification of cancellation of the data reading request corresponding to the buffer to the cancellation request unit 503 (Step S1505). Next, the unit 505 determines whether transfer of all the data regarding the client 100 is completed or not (Step S1506) and when it is completed, ends the processing related to the client 100. When not completed, the unit 505 waits for t sec. until the timing of transfer of the next data block (Step S1507) to proceed to Step S1503.

Figure 16:
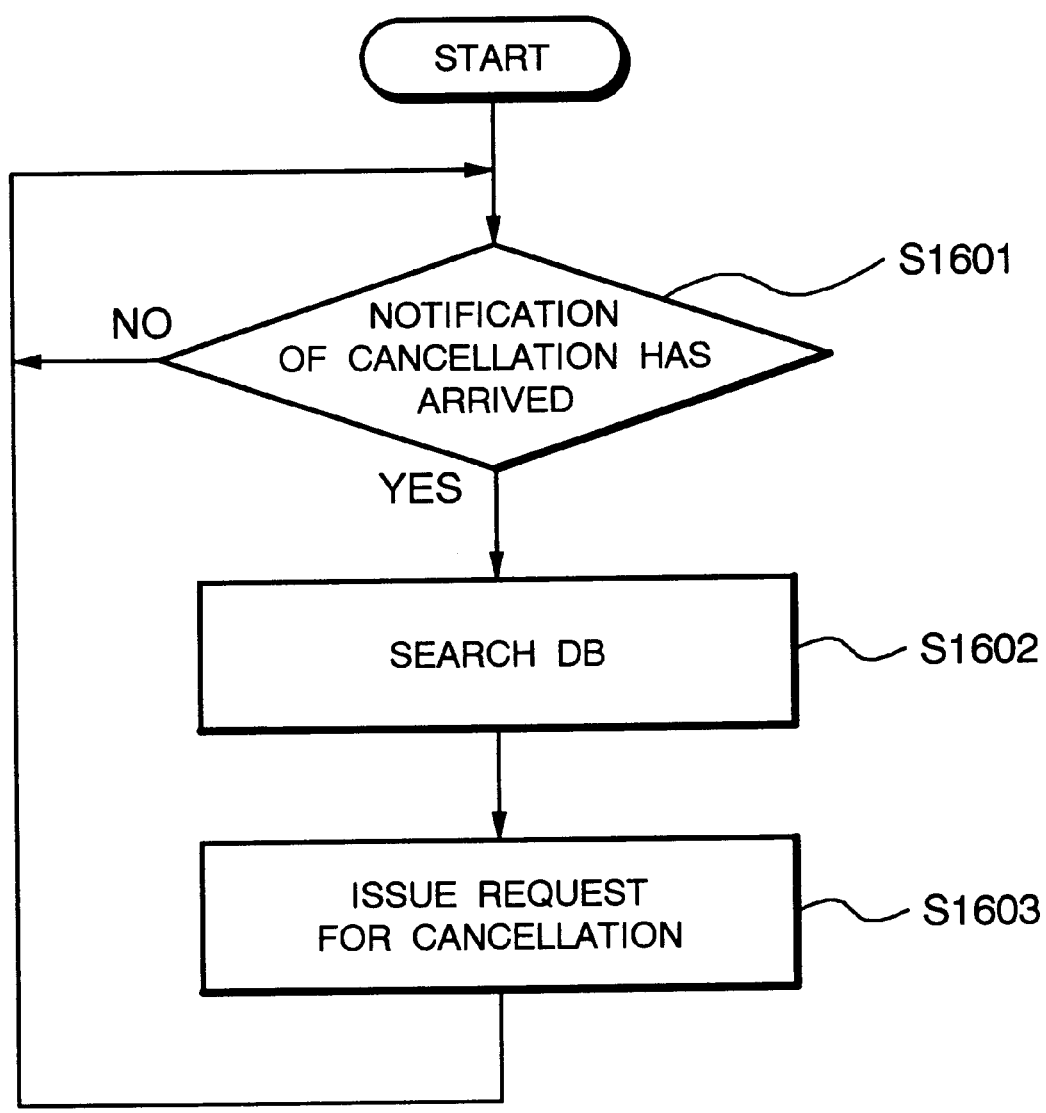
FIG. 16 is a flow chart showing operation of a cancellation request unit according to the fourth embodiment.

Processing of the cancellation request unit 503 will be described with reference to FIG. 16. The cancellation request unit 503, as the initial state, waits for a cancellation notification from the data transfer unit 505 (Step S1601). Upon receiving the cancellation notification, the unit 503 searches the I/O management data base 502 for an identifier of a data reading request corresponding to the buffer designated by the cancellation notification (Step S1602). Subsequently, the unit 503 designates the detected identifier and issues a cancellation request to the secondary storage unit 510 (Step S1603) to proceed to Step S1601.

Reading of useless data which will not be utilized at the client 100 can be thus prevented.

Figure 17:
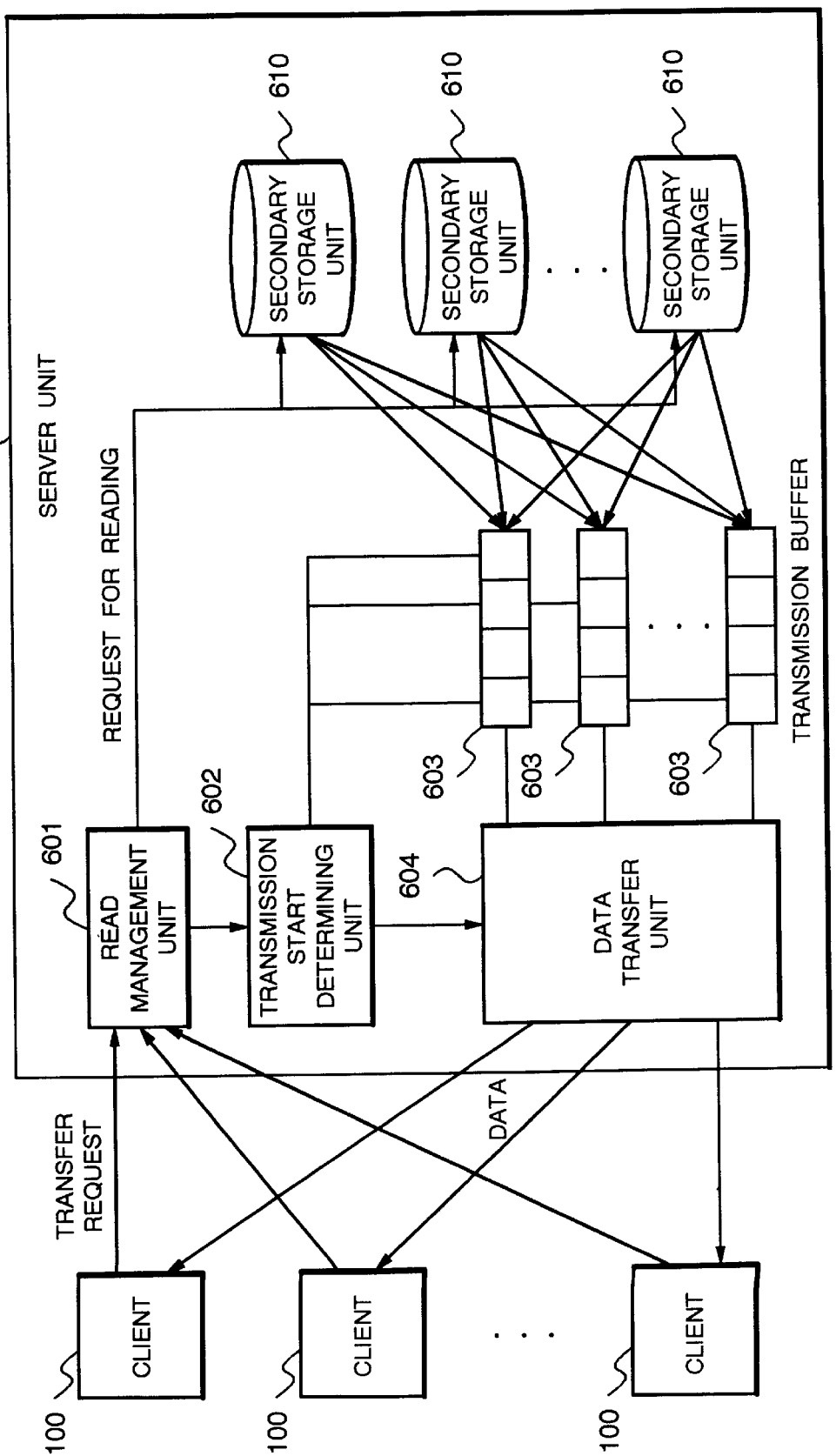
FIG. 17 is a block diagram showing structure of a stream transfer control system according to a fifth embodiment of the present invention.

FIG. 17 is a block diagram showing structure of a stream transfer control system according to a fifth embodiment of the present invention. With reference to FIG. 17, the stream transfer control system of the present embodiment includes a server unit 600 and a plurality of clients 100 connected to the server unit 600 through a network. The server unit 600 includes a read management unit 601, a transmission start determining unit 602, a transmission buffer 603, at least one secondary storage unit 610 and a data transfer unit 604. Stored in the secondary storage unit 610 are files in which streams (e.g. video data and voice data) are recorded. The file is divided, for example, into data blocks of fixed length.

In thus structured present embodiment, the transmission buffer 604 of the server unit 600 is the same as the transmission buffer 202 of the server unit 200 in the stream transfer control system according to the first embodiment shown in FIG. 1. In addition, reading processing conducted at the secondary storage unit 610 is the same as that at the secondary storage unit 210 in the first embodiment shown in FIG. 1. The processing of the read management unit 601 is the same as that of the read management unit 201 in the first embodiment shown in FIG. 1, with the only difference being that it sends a notification of transfer start also to the transmission start determining unit 602.

In the server unit 600, the transmission start determining unit 602 actually starts transfer after a lapse of a fixed time from when the notification of transfer start is given by the read management unit 601. The unit 602 has a timer for counting the waiting time. Processing conducted at the transmission start determining unit 602 on a client 100 basis is shown in FIG. 18.

Figure 18:
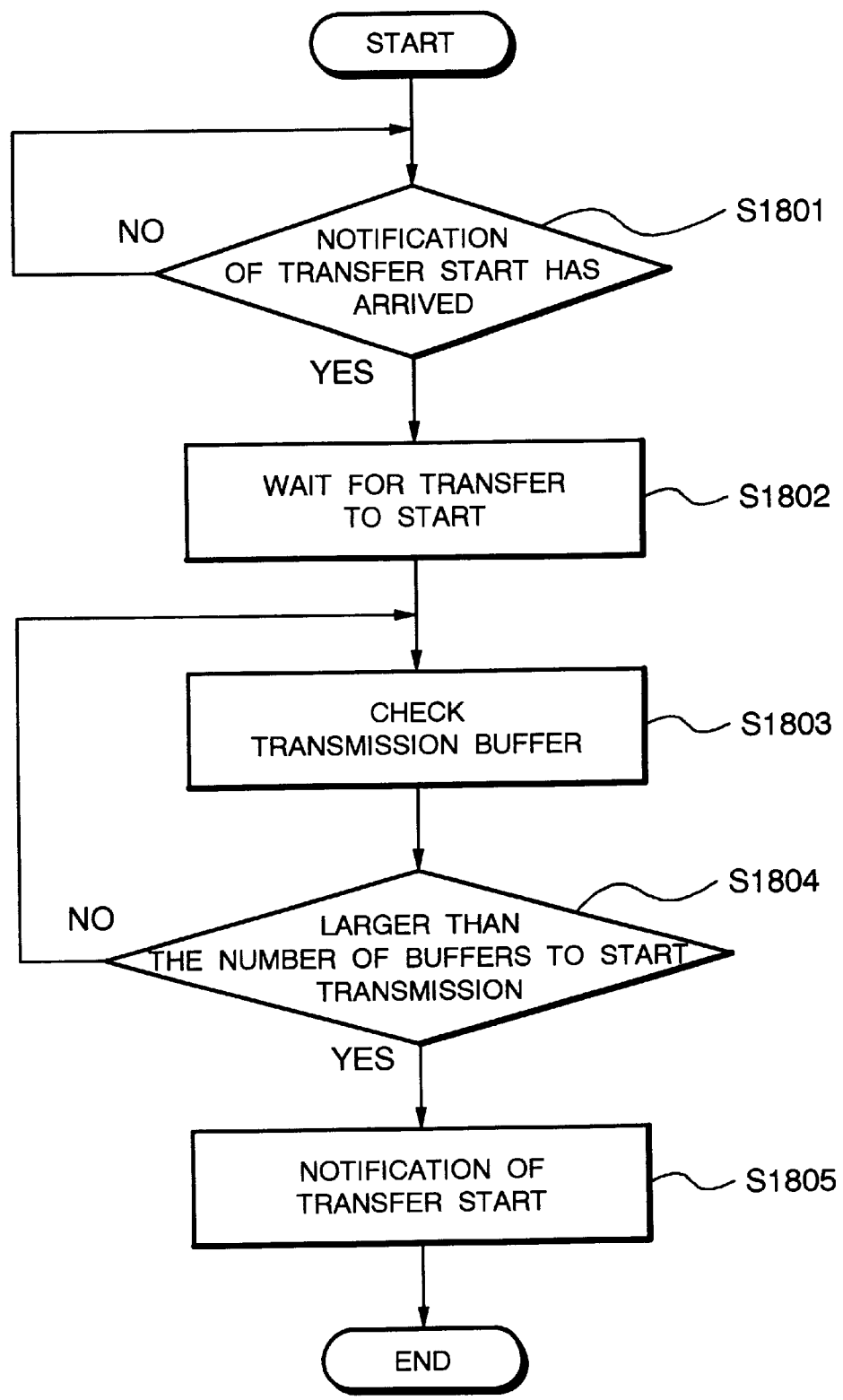
FIG. 18 is a flow chart showing operation of a transmission start determining unit according to the fifth embodiment.

With reference to FIG. 18, the transmission start determining unit 602 waits for a notification of transfer start from the read management unit 601 as the initial state (Step S1801). Upon receiving the notification of transfer start, the unit 602 waits for a fixed time (Tchk sec.) until transfer is started (Step S1802). Subsequently, the unit 602 checks the state of the transmission buffer 603 related to the client 100 to count the number of buffers (Bend) in which read data is stored (Step S1803). Then, the unit 602 compares a predetermined number of buffers to start transmission (Bsend) with the Bend counted at Step S1803 (Step S1804) and when Bsend>Bend, the routine returns to Step S1803. On the other hand, when Bsend≦Bend, the unit 602 notifies the data transfer unit 604 of transfer start (Step S1805).

The data transfer unit 604 manages, for each client 100, information regarding the client 100, information about transfer such as information regarding from which buffer of the transmission buffer 603 data is to be transferred and information about the number of data blocks yet to be transferred. Processing conducted at the data transfer unit 604 on a client 100 basis is shown in FIG. 19.

Figure 19:
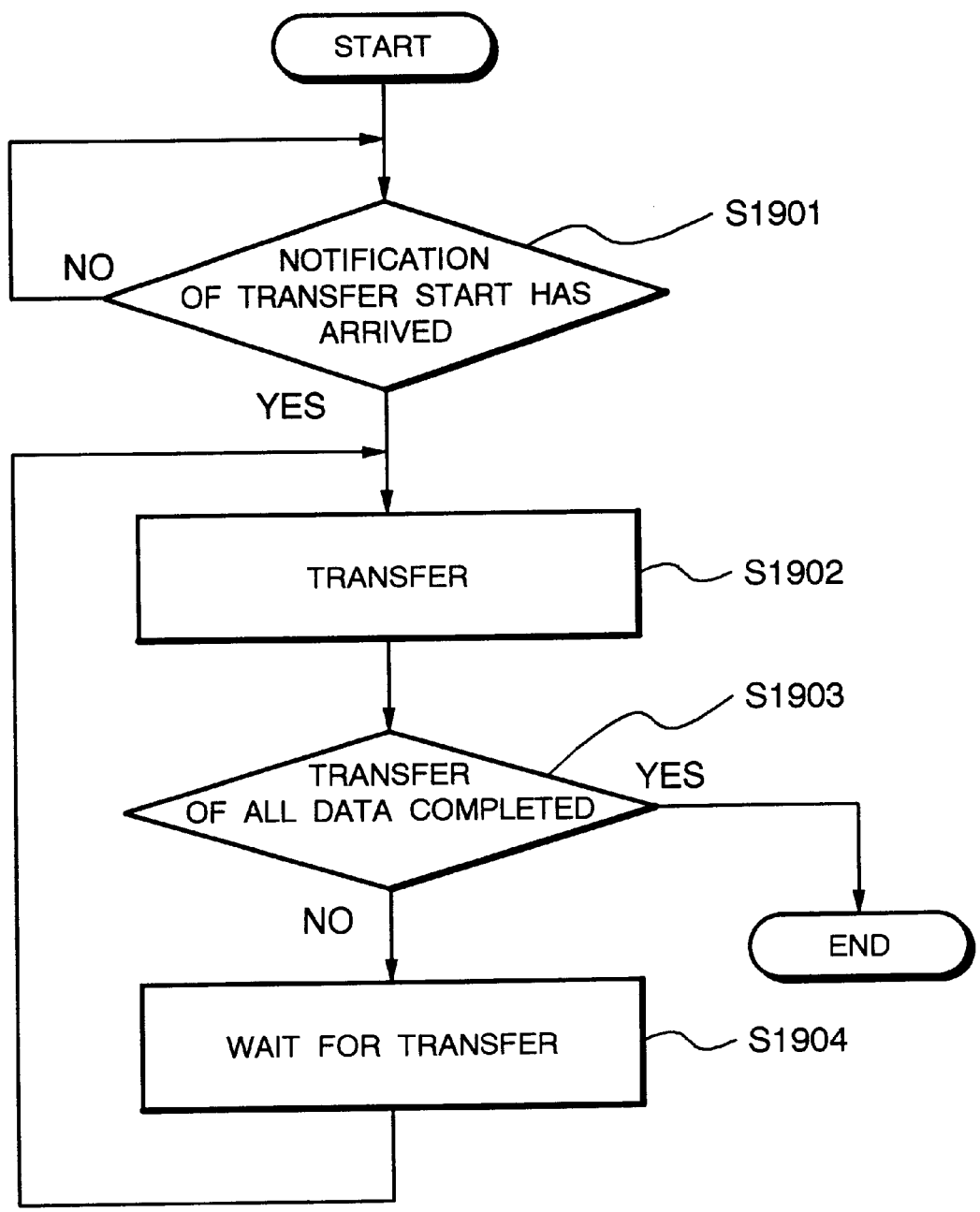
FIG. 19 is a flow chart showing operation of a data transfer unit according to the fifth embodiment.

With reference to FIG. 19, the data transfer unit 604, as the initial state, waits for the notification of transfer start from the transmission start determining unit 602 (Step S1901). When notified of the transfer start, the unit 604 transfers the data from the transmission buffer 603 to the client 100 (Step S1902). Subsequently, the unit 604 determines whether transfer of all the data regarding the client 100 is completed or not (Step S1903) and when it is completed, ends the processing regarding the client 100. On the other hand, when not completed, the unit 604 waits for the timing of transfer of the next data block for t sec. (Step S1904) to proceed to Step S1903.

Reading of useless data which will not be utilized at the client 100 can be thus prevented.

Figure 20:
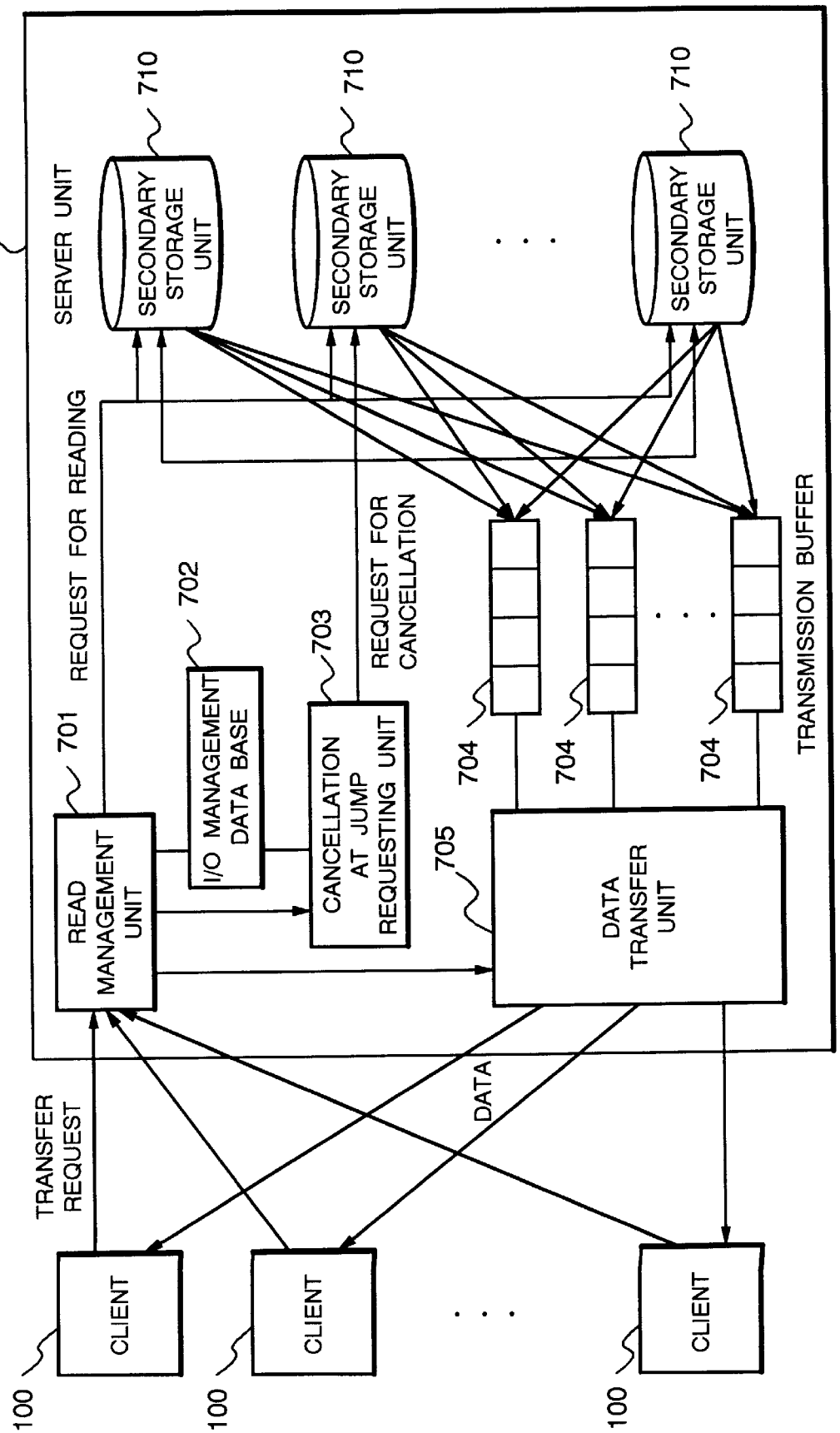
FIG. 20 is a block diagram showing structure of a stream transfer control system according to a sixth embodiment of the present invention.

FIG. 20 is a block diagram showing structure of a stream transfer control system according to a sixth embodiment of the present invention. With reference to FIG. 20, the stream transfer control system of the present embodiment includes a server unit 700 and a plurality of clients 100 connected to the server unit 700 through a network. The server unit 700 includes a read management unit 701, an I/O management data base 702, a cancellation at jump requesting unit 703, a transmission buffer 704, at least one secondary storage unit 710 and a data transfer unit 705. Stored in the secondary storage unit 710 are files in which streams (e.g. video data and voice data) are recorded. The file is divided, for example, into data blocks of fixed length.

In thus structured present embodiment, the transmission buffer 704 of the server unit 700 is the same as the transmission buffer 202 of the server unit 200 in the stream transfer control system according to the first embodiment shown in FIG. 1. In addition, reading processing conducted at the secondary storage unit 710 is the same as that at the secondary storage unit 210 in the first embodiment shown in FIG. 1, with the only difference being that the secondary storage unit 710 individually manages various requests including a data reading request based on identifiers corresponding to the individual requests similarly to that of the fourth embodiment shown in FIG. 13. Then, upon receiving a cancellation request with a designated identifier, the unit 710 conducts cancellation processing of the request corresponding to the identifier. The I/O management data base 702 records, in pairs, an identifier corresponding to each of the various requests issued to the secondary storage unit 710 and a buffer in which data read from the secondary storage unit 710 is to be stored.

In the server unit 700, the read management unit 701 receives a transfer request from the client 100, as well as managing, for each client 100, information regarding the secondary storage unit 710 from which data is to be read, information for issuing block offset of read data and information regarding a data reading request yet to be issued. Processing at the read management unit 701 conducted when no jump is made is the same as that of the read management unit 501 in the fourth embodiment shown in FIG. 14. Processing of the data transfer unit 705 conducted when no jump is made is the same as that of the data transfer unit 203 in the first embodiment shown in FIG. 4.

Figure 21:
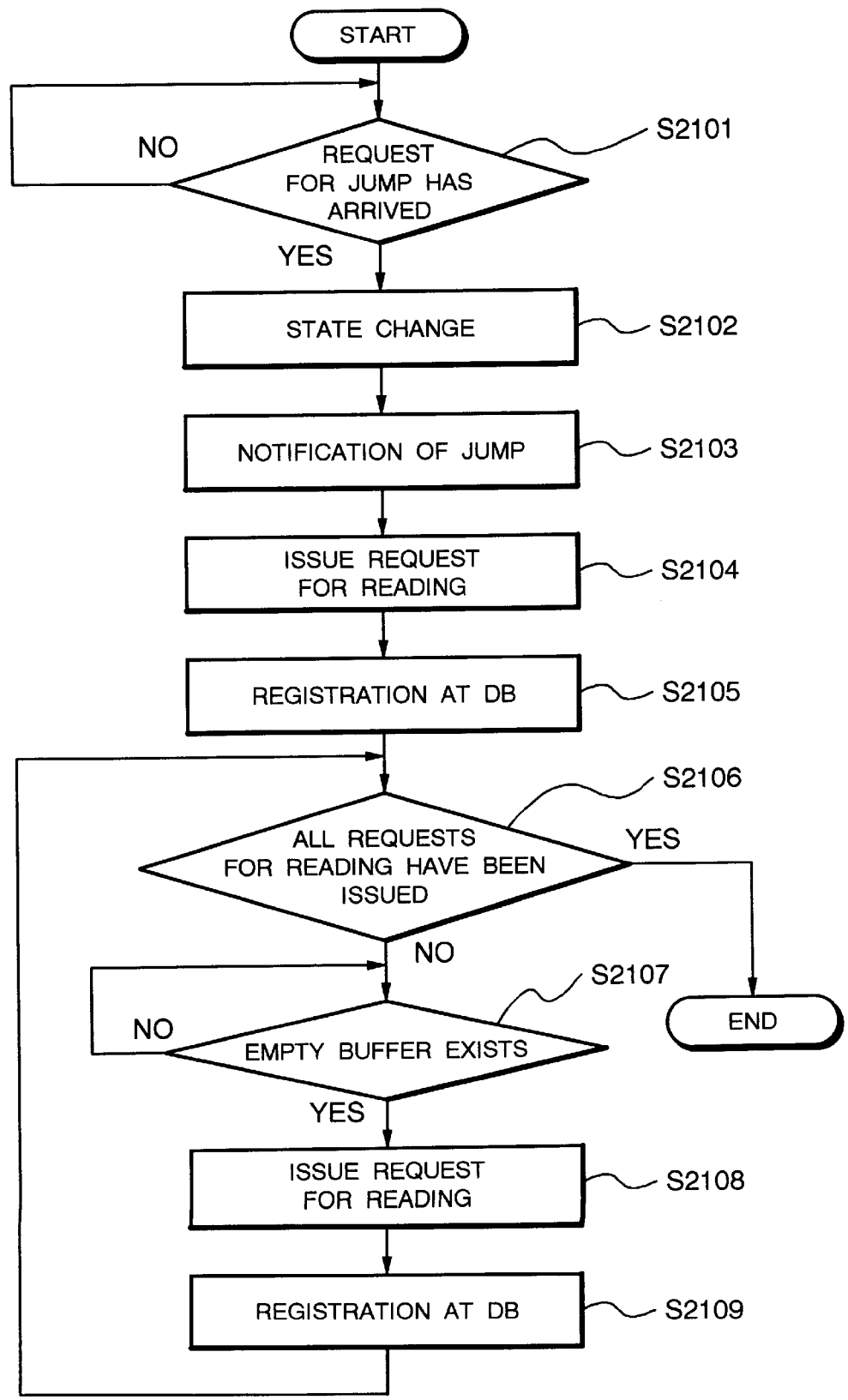
FIG. 21 is a flow chart showing operation of a read management unit according to the sixth embodiment.

Description will be made of the processing of the read management unit 701 to be conducted when a jump request is made. Processing at the read management unit 701 conducted at the time of jump is shown in FIG. 21. With reference to FIG. 21, the read management unit 701 waits for a jump request from a client 100 (Step S2101) and upon receiving a jump request, ends data reading processing being conducted with respect to the client 100 to store information regarding a file to be transferred (Step S2102). Then, the unit 701 notifies the cancellation at jump requesting unit 703 and the data transfer unit 705 of the reception of a jump request (Step S2103). Together with the notification of jump, the unit 701 gives notification of information about the client 100 which makes a request for jump, about an assigned buffer, about the number of blocks to be transferred, etc.

Subsequently, the unit 701 issues as many requests for reading data as buffers assigned to the client 100 to the secondary storage unit 710 (Step S2104). When the number of data to be transferred to the client 100 is smaller than the number of buffers assigned to the client 100, the unit 701 issues as many requests for reading data as blocks to be transferred at Step S2104. Then, the 701 registers information related to all the issued reading requests at the I/O management data base 702 (Step S2105).

Next, the unit 701 determines whether all the requests for data reading related to the client 100 have been issued or not (Step S2106) and when all the requests have been issued, ends processing regarding the client 100. On the other hand, when there remains a request for reading data yet to be issued, the unit 701 waits for a free space to be generated in the transmission buffer 704 assigned to the client 100 as a result of transfer of read data to the client 100 (Step S2107). When a free space is generated in the transmission buffer 704, the unit 701 issues a data reading request to the secondary storage unit 710 (Step S2108) and registers information regarding the issued data reading request at the I/O management data base 702 (Step S2109) to proceed to Step S2106.

In the foregoing processing, Step S2103 can be executed in parallel with Step S2102 or S2104. In addition, for the cyclic use in the order of transfer of data blocks, the transmission buffer 704 designates a buffer to store read data at the time of the issuance of a data reading request at Steps S2104 and S2108. Furthermore, issuance of data reading requests is conducted in the order of transfer of data blocks to the client 100.

Figure 22:
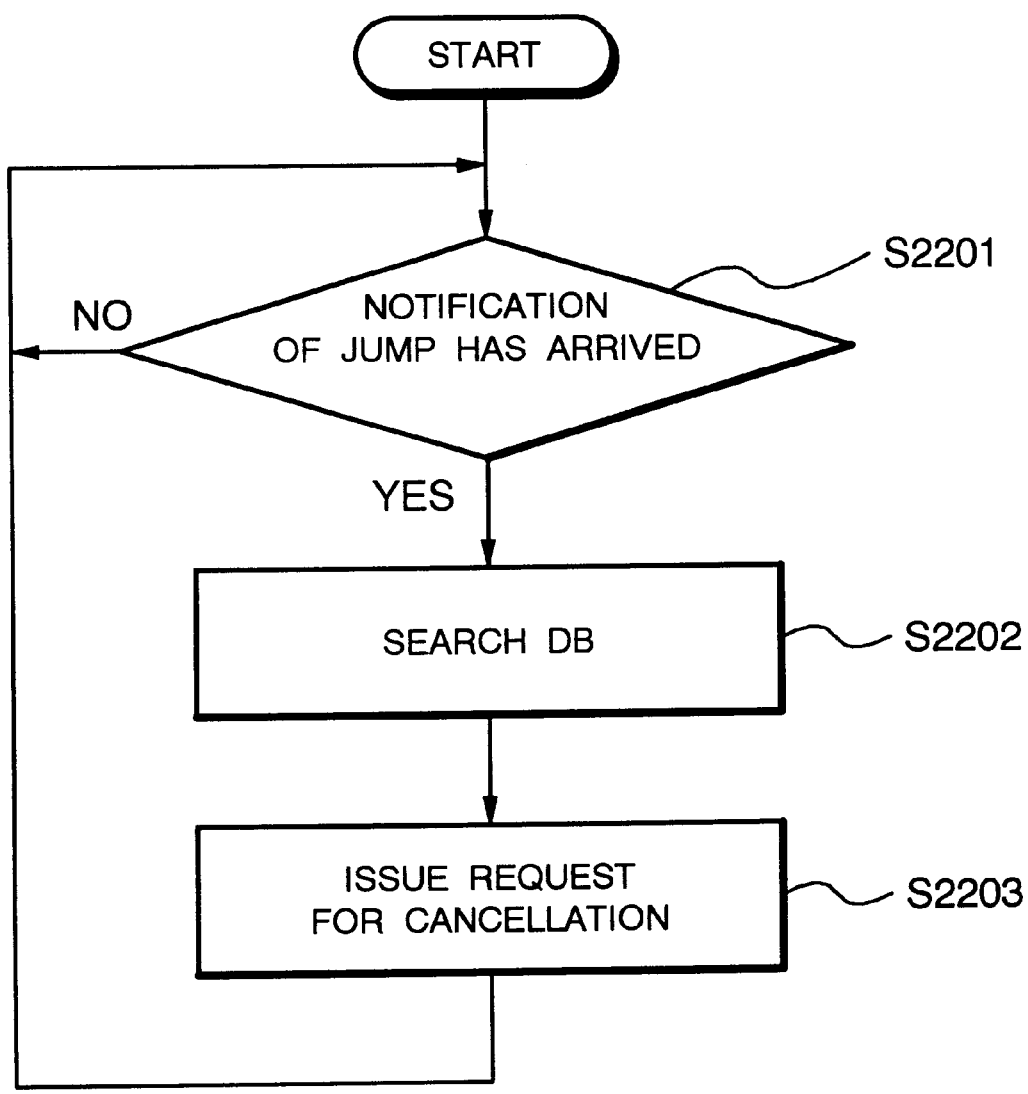
FIG. 22 is a flow chart showing operation of a cancellation at jump requesting unit according to the sixth embodiment.

The cancellation at jump requesting unit 703 waits for a notification of jump from the read management unit 701 as the initial state as shown in FIG. 22 (Step S2201). Upon receiving the notification of jump, the unit 703 searches the I/O management data base 702 for an identifier of a reading request corresponding to the buffer designated by the jump notification (Step S2202). Subsequently, the unit 703 designates the detected identifier and issues a cancellation request to the secondary storage unit 710 (Step S2203) to proceed to Step S2201. The secondary storage unit 710, upon receiving the cancellation request with a designated identifier, cancels the request corresponding to the identifier.

Figure 23:
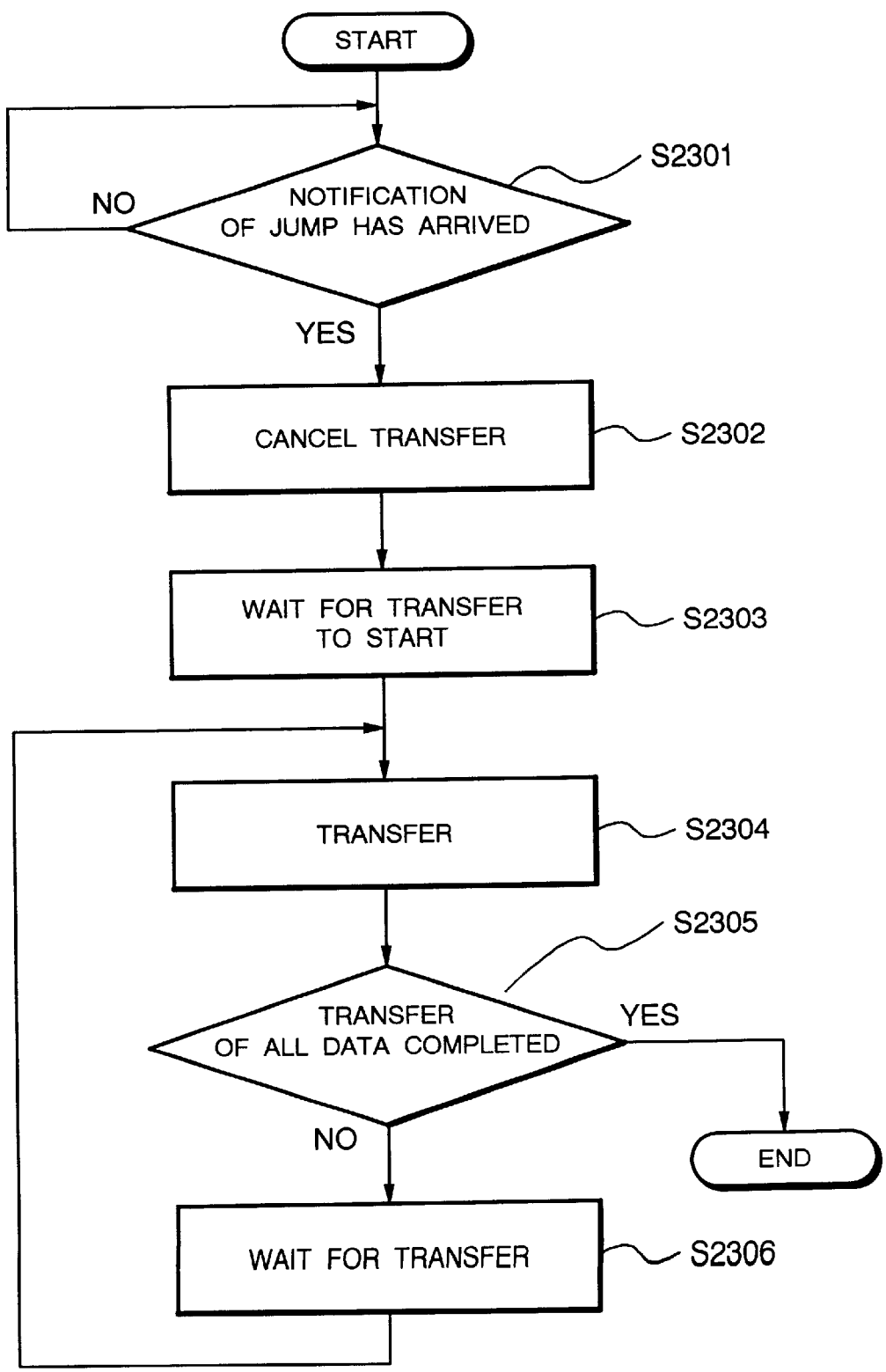
FIG. 23 is a flow chart showing operation of a data transfer unit according to the sixth embodiment.

Processing conducted at the data transfer unit 705 at the time of jump is shown in FIG. 23. With reference to FIG. 23, the data transfer unit 705 waits for a notification of jump from the read management unit 701 as the initial state (Step S2301) and upon receiving the notification of jump, stores information contained in the jump notification, cancels transfer regarding the client 100 and stores information such as the number of blocks to be transferred (Step S2302) to wait for a fixed time (Tjmp sec.) until the transfer is started (Step S2303). Then, the unit 705 transfers data from the transmission buffer 704 to the client 100 (Step S2304). Subsequently, the unit 705 determines whether transfer of all the data regarding the client 100 is completed or not (Step S2305) and when it is completed, ends the processing related to the client 100. On the other hand, when not completed, the unit 705 waits for the timing of transfer of the next data block for t sec. (Step S2306) to proceed to Step S2304.

Reading of useless data which will not be utilized at the client 100 can be thus prevented.

Figure 24:
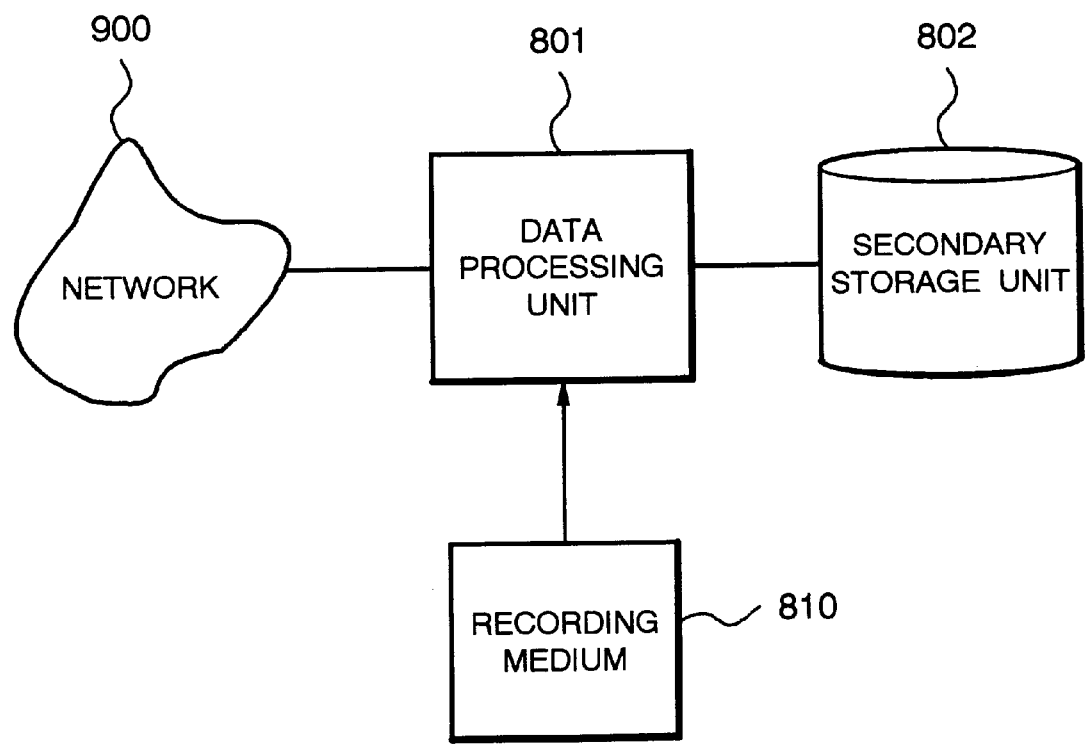
FIG. 24 is a block diagram showing one example of hardware structure which realizes the stream transfer control system of the present invention.

FIG. 24 is a block diagram showing one example of hardware structure of a server unit for use in the stream transfer control system according to the present invention. The server unit shown in FIG. 24 includes a data processing unit 801 connected to communicate with a client not shown over a network 900, and a secondary storage unit 802 connected to the data processing unit 801. Stored in the secondary storage unit 802 are files on which streams to be transferred to the client 100 are recorded.

The data processing unit 801 is composed of program-controlled CPU and memory of, for example, a work station or a personal computer. The control program is provided as the storage in a recording medium 810. A magnetic disk, a semiconductor memory or other common recording medium can be used as the recording medium 810. The program recorded on the recording medium 810 is read into the data processing unit 801 for controlling its operation so that the data processing unit 801 functions as the following means.

In the first embodiment shown in FIG. 1, the program controls the data processing unit 801 to function as the read management unit 201 and the data transfer unit 203.

In the second embodiment shown in FIG. 9, the program controls the data processing unit 801 to function as the read management unit 301, the transmission time calculating unit 302 and the data transfer unit 304.

In the third embodiment shown in FIG. 11, the program controls the data processing unit 801 to function as the read management unit 401, the transmission time period calculating unit 402 and the data transfer unit 404.

In the fourth embodiment shown in FIG. 13, the program controls the data processing unit 801 to function as the read management unit 501, the I/O management data base 502, the cancellation request unit 503 and the data transfer unit 505.

In the fifth embodiment shown in FIG. 17, the program controls the data processing unit 801 to function as the read management unit 601, the transmission start determining unit 602 and the data transfer unit 604.

In the sixth embodiment shown in FIG. 20, the program controls the data processing unit 801 to function as the read management unit 701, the I/O management data base 702, the cancellation at jump requesting unit 703 and the data transfer unit 705.

Description will be next made of the effects of the above-described respective embodiments of the present invention. In the present invention, a file on the secondary storage unit for storing streams is divided into data blocks. Transmission to a client and reading from the secondary storage unit are conducted on a data block basis. File here represents a unit of one coded moving image and voice.

In the first embodiment, the client 100 issues a request for transfer to the server unit 200 to start transfer of streams. In the server unit 200, the transfer request arrives at the read management unit 201. Upon receiving a transfer request, the read management unit 201 instructs the data transfer unit 203 to start transfer, as well as issuing, to the secondary storage unit 210, as many requests for reading data as transmission buffers assigned to the client 100. From this time on, the read management unit 201 issues a reading request to the secondary storage unit 210 every time a transmission buffer is emptied.

The secondary storage unit 210 receives a reading request from the read management unit 201, conducts reading processing and stores a read data block in the transmission buffer 202. The data transfer unit 203, when notified of transfer start by the read management unit 201, waits for a fixed time period until transmission starts and transmits a data block at the top of the reproduction existing in the transmission buffer 202 to the client 100. From this time on, the data transfer unit 203 transmits a data block in the transmission buffer 202 to the client 100 one after another at fixed time intervals.

Because a reading request is issued after ensuring a free space in the transmission buffer 202, there is neither a case where predetermined read data is overwritten by other read data nor a case where read data is not allowed to be stored in the transmission buffer 202. Then, provision of sufficiently many transmission buffers 202 makes it possible to set a long time period from the issuance of a reading request to the secondary storage unit 210 until transmission of data to the client 100.

Time required for individual reading processing by the secondary storage unit 210 varies with the amount of shifting of a magnetic head. However, variation in time of individual reading processing is negligible when observed in a long period of time. In other words, time required for individual reading processing can be regarded as being equal to a mean processing time when observed in a sufficiently long period of time. Therefore, setting a long period of time from the issuance of a reading request until transmission by providing many transmission buffers 202 leads to concealment of variation in individual reading processing time of the secondary storage unit 210.

On the other hand, the server unit 200 conducts transfer of a plurality of streams at a time, while it conducts no control of reading processing among streams at the secondary storage unit 210. As a result, the number of reading requests issued by each secondary storage unit 210 per unit time is not constant but varies with circumstances. In other words, the number of requests waiting for its reading processing at each secondary storage unit 210 changes depending on circumstances. A response time from the issuance of each reading request until the return of data accordingly changes with circumstances. The maximum number (worst value) of requests waiting for its processing at the secondary storage unit 210 is determined according to the number of streams, the number of secondary storage units 210 and other system structure. That is, even when the number of requests waiting for its processing is the worst value, as long as a sufficient time can be set from the issuance of a reading request until transmission, such a situation can be prevented that data reading is yet to be completed at the time of transmission. By providing many transmission buffers 202 and setting a time from the issuance of a reading request until transmission to be long, it is therefore possible to conceal the effect of the concentration of requests waiting for their processing on the secondary storage unit 210 exerted on a time required for reading processing.

As described in the foregoing, the first embodiment makes it possible to conceal variation in time required for data reading processing to achieve stable data distribution to a plurality of clients. In addition, since the secondary storage unit is allowed to individually estimate reading processing by using a mean processing time of the secondary storage unit, it is allowed to make the most of its throughput.

Furthermore, applying, to a data reading request issued by a data reading requesting source to the secondary storage unit, a period of validity (cancellation time) of processing conducted regarding the data reading request enables the secondary storage unit to recognize the period of validity of the data reading request received from the data reading requesting source. Then, at the stage of starting requested processing, the secondary storage unit compares a cancellation time of a request to be processed and the current time and only when the current time is yet to reach the cancellation time, processes the request. This enables the prevention of reading of useless data which will not be used at the data reading requesting source.

The same effect can be attained by determining upper bounds of time within which the data can be effectively used in place of a cancellation time and determining whether data reading is to be conducted or not based on the time.

Next, the second embodiment, similarly to the first embodiment, makes possible stable data distribution to a plurality of clients and also makes it possible to make the most of a throughput of a secondary storage unit. In addition, applying a cancellation time to a data reading request allows the secondary storage unit to control so as not to conduct data reading processing which will not be in time for transmission to a client. This prevents reading processing of such useless data from waiting reading processing of other effective data. As a result, response of the processing conducted with respect to a request for reading effective data is improved to enhance stability of data distribution by the server unit.

The third embodiment attains the same effect by applying, to a data reading request, upper bounds of time within which the data can be effectively used in place of a cancellation time and determining whether data reading is to be executed or not based on the time.

The fourth embodiment, similarly to the first embodiment, enables stable data distribution to a plurality of clients and also makes it possible to make the most of a throughput of a secondary storage unit. In addition, by issuing a request for cancellation for the cancellation of a data reading request which will not be in time for transmission to a client by means of a cancellation requesting means, the fourth embodiment allows the secondary storage unit to control so as not to conduct useless data reading processing. As a result, response of the processing conducted with respect to a request for reading effective data is improved to enhance stability of data distribution by the server unit.

The fifth embodiment, similarly to the first embodiment, enables stable data distribution to a plurality of clients and also makes it possible to make the most of a throughput of the secondary storage unit.

At a steady state, normal reproduction can not be conducted at a client unless data blocks are continuously transmitted from the server unit to the client at fixed time intervals. Staggering data transmission timing at a steady state will affect quality of reproduction. However, immediately after the start of data transmission (start of reproduction), only a waiting time until reproduction of the data is started is increased or decreased but quality of reproduction will not be affected. In other words, unlike at a steady state, time of starting transmission can be staggered with ease. On the other hand, a time from when a reading request is issued at the server unit until when data is read changes depending on circumstances. When a time from the arrival of a transfer request at the server unit until the start of transmission to a client is short, therefore, data reading will not be in time for transmission conducted immediately after the start of reproduction, which might cause problem in quality of the reproduction at the client. In other words, unless a time before transmission to a client is started is long enough, normal reproduction can not be realized immediately after the start of reproduction. However, since a waiting time for the transmission which enables normal reproduction to start changes with circumstances, it is not always necessary to set a time before the transmission starts to be long. Then, a transmission start determining means is used to check the amount of data stored in a transmission buffer, thereby dynamically changing a transmission starting time. More specifically, transmission is started at a stage where a fixed number of data blocks are stored in the transmission buffer. In other words, control of the amount of data blocks stored in the transmission buffer enables transmission start timing to be set according to circumstances. In addition, immediately after the start of transmission, reliable transmission is ensured because several blocks are already stored in the transmission buffer.

As described in the foregoing, the fifth embodiment enables a waiting time immediately after the start of reproduction to be modified according to circumstances while stabilizing distribution of streams immediately after the start of reproduction.

Next, the sixth embodiment, similarly to the first embodiment, enables stable data distribution to a plurality of clients and also makes it possible to make the most of a throughput of a secondary storage unit.

In a case of issuance of data reading requests to the secondary storage unit by means of the transmission buffer ahead of time, a plurality of reading requests regarding each stream are being constantly issued to the secondary storage unit. Therefore, when a jump request is issued by a client to modify a reproduction position, the issued plurality of data reading requests will become useless. Executing such useless data reading to occupy the secondary storage unit results in delaying reading processing of other effective data. Then, a cancellation at jump requesting means is used to cancel reading processing of data which will not be transmitted to a client due to the change of a reproduction position made at the time of reception of a jump request, thereby reducing useless processing at the secondary storage unit at the time of issuance of a jump request to improve stability of data distribution at the server unit.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A stream transfer control system comprising a server unit and a plurality of clients connected through a network, said server unit including a secondary storage unit for storing a file which stores streams and is divided into a plurality of data blocks and transferring streams to the plurality of said clients over said network at a request for transfer from said client, wherein said server unit comprising:

transmission buffer means provided in the plural corresponding to said respective clients for temporarily holding a data block of a file read from said secondary storage unit;

read management means for issuing, upon reception of a transfer request from said client, as many data reading requests as said transmission buffer means corresponding to said client which has transmitted the transfer request, as well as every time said data blocks stored in said transmission buffer means are read to empty said transmission buffer means, issuing as many data reading requests as said transmission buffer means emptied; and data transfer means for, after a lapse of a fixed time from the arrival of said transfer request at said read management unit and at every lapse of the fixed time from then on, reading a data block in said transmission buffer means and continuously transmitting the same to said client which has transmitted said transfer request.

2. The stream transfer control system as set forth in claim 1, wherein said read management means as an issuing source of said data reading request applies, to said data reading request, cancellation time as a time of canceling the data reading request and issues said request, and said secondary storage unit comprising a storage medium storing said file, a timer, request cancellation determining means for comparing said request cancellation time and the current time counted by said timer to determine to cancel said data reading request with said request cancellation time applied thereto when the current time is past said request cancellation time, and reading processing means for sending, at the time of start of data reading processing based on said data reading request, said request cancellation time applied to said data reading request to said request cancellation determining means to conduct data reading processing based on the data reading request when determination to cancel is not made by said request cancellation determining means.

3. The stream transfer control system as set forth in claim 1, wherein said read management means as an issuing source of said data reading request applies, to said data reading request, a request cancellation time period as a time period before the data reading request is canceled and issues said request, and said secondary storage unit comprising
a storage medium storing said file,
a timer,
request cancellation time calculating means, based on a request cancellation time period applied to said data reading request and the current time counted by said timer, for calculating a request cancellation time of canceling said data reading request,
request cancellation determining means for comparing said request cancellation time calculated by said request cancellation time calculating means and the current time counted by said timer to determine to cancel said data reading request with said request cancellation time applied thereto when the current time is past said request cancellation time, and
reading processing means for sending, at the time of start of data reading processing based on said data reading request, said request cancellation time applied to said data reading request to said request cancellation determining means to conduct data reading processing based on the data reading request when determination to cancel is not made by said request cancellation determining means.

4. The stream transfer control system as set forth in claim 1, further comprising transmission time calculating means for determining a data block transmission time, wherein
said read management means applies, to said data reading request to be issued based on a transfer request received from said client, a transmission time determined by said transmission time calculating means as a request cancellation time which is a time of canceling the data reading request, wherein
said secondary storage unit comprising
request cancellation determining means for comparing said request cancellation time and the current time to determine to cancel said data reading request with said request cancellation time applied thereto when the current time is past said request cancellation time, and
reading processing means for sending, at the time of start of data reading processing based on said data reading request, said request cancellation time applied to said data reading request to said request cancellation determining means to conduct data reading processing based on the data reading request when determination to cancel is not made by said request cancellation determining means.

5. The stream transfer control system as set forth in claim 1, further comprising transmission time period calculating means for determining a time period for conducting data block transmission processing, wherein
said read management means applies, to said data reading request to be issued based on a transfer request received from said client, a transmission time period determined by said transmission time period calculating means as a request cancellation time period which is a time before the data reading request is canceled, and said secondary storage unit comprising
request cancellation time calculating means, based on a request cancellation time period applied to said data reading request and the current time, for calculating a request cancellation time of canceling said data reading request,
request cancellation determining means for comparing said request cancellation time calculated by said request cancellation time calculating means and the current time to determine to cancel said data reading request with said request cancellation time applied thereto when the current time is past said request cancellation time, and
reading processing means for sending, at the time of start of data reading processing based on said data reading request, said request cancellation time applied to said data reading request to said request cancellation determining means to conduct data reading processing based on the data reading request when determination to cancel is not made by said request cancellation determining means.

6. The stream transfer control system as set forth in claim 1, further comprising:

an I/O management data base for recording a data reading request issued by said read management unit, and cancellation requesting means, when at the time of transmission of data by said data transfer means, data reading of said data block is not completed, for searching said I/O management data base for said data reading request corresponding to the reading processing of the data to issue a cancellation request for canceling said data reading request detected to said secondary storage unit.

7. The stream transfer control system as set forth in claim 1, further comprising transmission start determining means for monitoring a state of said transmission buffer means after a lapse of a fixed time since when said transfer request arrives at said read management unit, and when more than a prescribed number of data is stored in said transmission buffer means, outputting a notification instructing on the start of transmission of said data, wherein
said data transfer means, upon reception of a notification of transmission start from said transmission start determining means and at every lapse of said fixed time from then on, reads a data block in said transmission buffer means and continuously transmits the same to said client which has transmitted said transfer request.

8. The stream transfer control system as set forth in claim 1, further comprising:

an I/O management data base for recording a data reading request issued by said read management unit, and cancellation at jump requesting means, upon reception of a jump request from said client, for searching said I/O management data base for a data reading request already issued to issue a cancellation request for canceling said data reading request detected to said secondary storage unit, wherein
said read management unit, on receiving said jump request, issues said data reading request based on the jump request, a well as every time said data blocks stored in said transmission buffer means are read to empty said transmission buffer means, issuing as many data reading requests as said transmission buffer means emptied, and said data transfer means, upon reception of a jump request by said read management means, cancels data transmission being executed to said client which has transmitted the jump request, and after a lapse of a fixed time since when said read management unit receives said jump request and at every lapse of the fixed time from then on, reads a data block in said transmission buffer means and continuously transmits the same to said client which has transmitted said transfer request.

9. A data reading method in a stream transfer control system comprising a server unit and a plurality of clients connected through a network, said server unit including a secondary storage unit for storing a file which stores streams and is divided into a plurality of data blocks and transferring streams to the plurality of said clients over said network at a request for transfer from said client, the data reading method comprising the steps of:

upon reception of a transfer request from said client, issuing as many data reading requests as said clients which have transmitted the transfer request, as well as every time said data blocks stored in said transmission buffer means are read to empty said transmission buffer means, issuing as many data reading requests as said transmission buffer means emptied, temporality holding a data block of a file read from said secondary storage unit at transmission buffer means provided in the plural corresponding to said respective clients, and after a lapse of a fixed time from the arrival of said transfer request at said read management means and at every lapse of the fixed time from then on, reading a data block in said transmission buffer means and continuously transmits the data block to said client which has transmitted said transfer request.

10. The data reading method as set forth in claim 9, wherein at the issuance of said data reading request based on a transfer request received from said client, applying a request cancellation time as a time of canceling the data reading request to said data reading request, at the start of data reading processing based on said data reading request, comparing said request cancellation time applied to said data reading request and the current time and when the current time is past said request cancellation time, determining to cancel said data reading request with said request cancellation time applied thereto, and when the determination is not made to cancel said reading request, conducting data reading processing based on the data reading request.

11. The data reading method as set forth in claim 9, wherein at the issuance of said data reading request based on a transfer request received from said client, applying a request cancellation time period as a time before the data reading request is canceled to said data reading request, at the start of data reading processing based on said data reading request, calculating a request cancellation time as a time of canceling said data reading request based on said request cancellation time period applied to said data reading request and the current time, comparing said request cancellation time and the current time and when the current time is past said request cancellation time, determining to cancel said data reading request with said request cancellation time applied thereto, and when the determination is not made to cancel said data reading request, conducting data reading processing based on the data reading request.

12. The data reading method as set forth in claim 9, wherein recording said data reading request at a data base, when data reading of said data block is not completed at a time point when said data transfer means transmits data, searching said I/O management data base for said data reading request corresponding to the reading processing of the data, and issuing a cancellation request for canceling said data reading request detected to said secondary storage unit.

13. The data reading method as set forth in claim 9, wherein monitoring a state of said transmission buffer means after a lapse of a fixed time since the arrival of said transfer request at said read management means, when more than a prescribed number of data is stored in said transmission buffer means, outputting a notification instructing on transmission start of said data, and at the time of output of said notification of transmission start and at every lapse of said fixed time from then on, reading a data block in said transmission buffer means and continuously transmitting the same to said client which has transmitted said transfer request.

14. The data reading method as set forth in claim 9, wherein recording said data reading request at a data base, at the reception of a jump request from said client, searching said data base for a data reading request already issued, issuing a cancellation request for canceling said data reading request detected to said secondary storage unit, issuing said data reading request based on said jump request, as well as every time said data blocks stored in said transmission buffer means are read to empty said transmission buffer means, issuing as many data reading requests as said transmission buffer means emptied, canceling data transmission being executed to said client which has transmitted the jump request, and after a lapse of a fixed time since the reception of said jump request by said read management means and at every lapse of the fixed time from then on, reading a data block in said transmission buffer means and continuously transmitting the same to said client which has transmitted said transfer request.

15. A computer readable memory storing a control program for controlling a data processing unit connected to a client through a network for reading streams from a secondary storage unit which stores a file storing streams and divided into a plurality of data blocks in response to a transfer request from said client and transferring said streams to the plurality of said clients over said network, said control program comprising the steps of:

upon reception of a transfer request from said client, issuing as many data reading requests as said clients which have transmitted the transfer request, as well as every time said data blocks stored in said transmission buffer means are read to empty said transmission buffer means, issuing as many data reading requests as said transmission buffer means emptied;

temporality holding a data block of a file read from said secondary storage unit at the plurality of transmission buffer means provided corresponding to said respective clients; and after a lapse of a fixed time since the arrival of said transfer request at said read management means and every lapse of the fixed time from then on, reading a data block in said transmission buffer means and continuously transmitting the same to said client which has transmitted said transfer request.

16. The computer readable memory as set forth in claim 15, wherein said control program at the issuance of said data reading request based on a transfer request received from said client, applying a request cancellation time as a time of canceling the data reading request to said data reading request, at the start of data reading processing based on said data reading request, comparing said request cancellation time applied to said data reading request and the current time and when the current time is past said request cancellation time, determining to cancel said data reading request with said request cancellation time applied thereto, and when the determination is not made to cancel said reading request, conducting data reading processing based on the data reading request.

17. The computer readable memory as set forth in claim 15, wherein said control program at the issuance of said data reading request based on a transfer request received from said client, applying a request cancellation time period as a time before the data reading request is canceled to said data reading request, at the start of data reading processing based on said data reading request, calculating a request cancellation time as a time of canceling said data reading request based on a request cancellation time period applied to said data reading request and the current time, comparing said request cancellation time and the current time and when the current time is past said request cancellation time, determining to cancel said data reading request with said request cancellation time applied thereto, and when the determination is not made to cancel said data reading request, conducting data reading processing based on the data reading request.

18. The computer readable memory as set forth in claim 15, wherein said control program further recording said data reading request at a data base, when data reading of said data block is not completed at a time point when said data transfer means transmits data, searching said I/O management data base for said data reading request corresponding to the reading processing of the data, and issuing a cancellation request for canceling said data reading request detected to said secondary storage unit.

19. The computer readable memory as set forth in claim 15, wherein said control program further monitoring a state of said transmission buffer means after a lapse of a fixed time since the arrival of said transfer request at said read management means, when more than a prescribed number of data is stored in said transmission buffer means, outputting a notification instructing on transmission start of said data, and at the time of output of said notification of transmission start and at every lapse of said fixed time from then on, reading a data block in said transmission buffer means and continuously transmitting the same to said client which has transmitted said transfer request.

20. The computer readable memory as set forth in claim 15, wherein said control program further recording said data reading request at a data base, at the reception of a jump request from said client, searching said data base for a data reading request already issued, issuing a cancellation request for canceling said data reading request detected to said secondary storage unit, issuing said data reading request based on said jump request, as well as every time said data blocks stored in said transmission buffer means are read to empty said transmission buffer means, issuing as many data reading requests as said transmission buffer means emptied, canceling data transmission being executed to said client which has transmitted the jump request, and after a lapse of a fixed time since the reception of said jump request by said read management means and at every lapse of the fixed time from then on, reading a data block in said transmission buffer means and continuously transmitting the same to said client which has transmitted said transfer request.

* * * * *